United States Patent
Dou et al.

(10) Patent No.: US 12,113,572 B2
(45) Date of Patent: Oct. 8, 2024

(54) METHOD AND APPARATUS FOR CALCULATING CONFIGURATION OF OPTICAL TRANSMISSION NETWORK, AND OPTICAL TRANSMISSION NETWORK SYSTEM

(71) Applicant: Alibaba (China) Co., Ltd., Hangzhou (CN)

(72) Inventors: Liang Dou, Beijing (CN); Chongjin Xie, Morganville, NJ (US); Jingchi Cheng, Beijing (CN); Pak Tao Lau, Beijing (CN)

(73) Assignee: Alibaba (China) Co., Ltd., Hangzhou (CN)

( * ) Notice: Subject to any disclaimer, the term of this patent is extended or adjusted under 35 U.S.C. 154(b) by 116 days.

(21) Appl. No.: 18/066,643

(22) Filed: Dec. 15, 2022

(65) Prior Publication Data

US 2023/0198615 A1   Jun. 22, 2023

(30) Foreign Application Priority Data

Dec. 22, 2021 (CN) .......................... 202111585211.2

(51) Int. Cl.
*H04B 10/00* (2013.01)
*H04B 10/079* (2013.01)
(Continued)

(52) U.S. Cl.
CPC ... *H04B 10/07955* (2013.01); *H04B 10/0797* (2013.01); *H04J 14/0221* (2013.01)

(58) Field of Classification Search
CPC .............. H04B 10/079; H04B 10/0793; H04B 10/07955; H04B 10/0797
See application file for complete search history.

(56) References Cited

U.S. PATENT DOCUMENTS 6,529,316 B1 * 3/2003 Treyz ................ H04B 10/0797
                                                    359/337.2
11,057,142 B1   7/2021 Jiang
(Continued)

FOREIGN PATENT DOCUMENTS

CN   1456932 A   11/2003
CN   1580927 A    2/2005
(Continued)

OTHER PUBLICATIONS

First Office Action issued in corresponding Chinese Application No. 202111585211.2 on Feb. 20, 2023 (7 pages).
(Continued)

*Primary Examiner* — Daniel G Dobson
(74) *Attorney, Agent, or Firm* — Finnegan, Henderson, Farabow, Garrett & Dunner, LLP

(57) ABSTRACT

A method for calculating configuration of an optical transmission network includes: acquiring an initial value of an input power of an optical cable; based on the initial value, obtaining an output power of each channel at an end of a section of the optical cable according to a loss of the optical cable; taking the output power of each channel at the end of the section as a boundary condition to calculate the input power of each channel at the section based on an amount of optical power transferred from a high-frequency channel to a low-frequency channel due to an SRS effect; and calculating a first parameter value of an optical amplifier of the section using the input power of each channel at the section and the output power of each channel at the end of a preceding section of the section.

20 Claims, 8 Drawing Sheets

(51) Int. Cl.
    *H04J 14/02*     (2006.01)
    *H04J 14/00*     (2006.01)

(56) References Cited

U.S. PATENT DOCUMENTS

| | | | |
|---|---|---|---|
| 2002/0114062 A1* | 8/2002 | Simard | H04B 10/0775 359/337 |
| 2014/0147113 A1 | 5/2014 | Auge | |
| 2019/0253361 A1* | 8/2019 | MacKay | H04B 10/0779 |

FOREIGN PATENT DOCUMENTS

| | | |
|---|---|---|
| CN | 1661452 A | 8/2005 |
| CN | 102307068 A | 1/2012 |
| CN | 102598707 A | 7/2012 |
| CN | 103178901 A | 6/2013 |
| CN | 106788709 A | 5/2017 |
| CN | 111587545 A | 8/2020 |
| CN | 113536725 A | 10/2021 |
| CN | 113687553 A | 11/2021 |
| CN | 113708839 A | 11/2021 |

OTHER PUBLICATIONS

Ting et al., "Research and design of transmission distance tolerance in 400 GB/s communication system," Optical Communication Technology, 44(1): 27-30, 2020.

\* cited by examiner

METHOD AND APPARATUS FOR CALCULATING CONFIGURATION OF OPTICAL TRANSMISSION NETWORK, AND OPTICAL TRANSMISSION NETWORK SYSTEM

CROSS-REFERENCE TO RELATED APPLICATIONS

The present application claims priority to and the benefits of Chinese Patent Application Serial No. 202111585211.2, filed on Dec. 22, 2021, entitled "METHOD AND APPARATUS FOR CALCULATING CONFIGURATION OF OPTICAL TRANSMISSION NETWORK, AND OPTICAL TRANSMISSION NETWORK SYSTEM," which is incorporated herein by reference in its entirety.

TECHNICAL FIELD

Embodiments of this disclosure relate to the field of communication technologies, and in particular, to a method for calculating configuration of an optical transmission network. One or more embodiments of this disclosure also relate to an apparatus for calculating configuration of an optical transmission network, an optical transmission network system, a computing device, and a computer-readable storage medium.

BACKGROUND

In an optical transmission network based on a Dense Wavelength Division Multiplexing system (DWDM), the performance of an end-to-end project will be affected by configuration of the optical transmission network. At present, the Gaussian Noise (GN) model, the Local Optimization leads to Global Optimization (LOGO) algorithm, etc. are usually used to evaluate the influence of noise on a system, and the configuration of the optical transmission network is calculated accordingly.

However, as the optical transmission network technology develops, in order to improve the transmission capacity of optical fibers, the band has been continuously evolved, and the influence of noise on the system has become more complex. Therefore, in a complex optical transmission network, how to calculate the configuration of an optical transmission network with superior performance is a challenging problem.

SUMMARY

Embodiments of the present disclosure provide a method for calculating configuration of an optical transmission network. The method can include: acquiring an initial value of an input power of an optical cable; based on the initial value of the input power of the optical cable, obtaining an output power of each channel at an end of a section of the optical cable according to a loss of the optical cable; taking the output power of each channel at the end of the section of the optical cable as a boundary condition to calculate the input power of each channel at the section of the optical cable based on an amount of optical power transferred from a high-frequency channel to a low-frequency channel due to an SRS effect; and calculating a first parameter value of an optical amplifier of the section of the optical cable using the input power of each channel at the section of the optical cable and the output power of each channel at the end of a preceding section of the section of the optical cable.

Embodiments of the present disclosure provide a computing device. The computing device can include a memory configured to store computer-executable instructions; and one or more processors coupled to the memory and configured to execute the computer-executable instructions to: acquire an initial value of an input power of an optical cable; based on the initial value of the input power of the optical cable, obtain an output power of each channel at the end of a section of the optical cable according to a loss of the optical cable; take the output power of each channel at the end of the section of the optical cable as a boundary condition to calculate the input power of each channel at the section of the optical cable based on an amount of optical power transferred from a high-frequency channel to a low-frequency channel due to an SRS effect; and calculate a first parameter value of an optical amplifier of the section of the optical cable using the input power of each channel at the section of the optical cable and the output power of each channel at the end of a preceding section of the section of the optical cable.

Embodiments of the present disclosure provide a non-transitory computer-readable storage medium. The non-transitory computer-readable storage medium can store a set of instructions that are executable by one or more processors of a device to cause the device to perform a method for calculating configuration of an optical transmission network. The method can include acquiring an initial value of an input power of an optical cable; based on the initial value of the input power of the optical cable, obtaining an output power of each channel at an end of a section of the optical cable according to a loss of the optical cable; taking the output power of each channel at the end of the section of the optical cable as a boundary condition to calculate the input power of each channel at the section of the optical cable based on an amount of optical power transferred from a high-frequency channel to a low-frequency channel due to an SRS effect; and calculating a first parameter value of an optical amplifier of the section of the optical cable using the input power of each channel at the section of the optical cable and the output power of each channel at the end of a preceding section of the section of the optical cable.

It should be understood that the above general descriptions and the following detailed descriptions are merely for exemplary and explanatory purposes, and do not limit the present disclosure.

DETAILED DESCRIPTION

Figure 1:
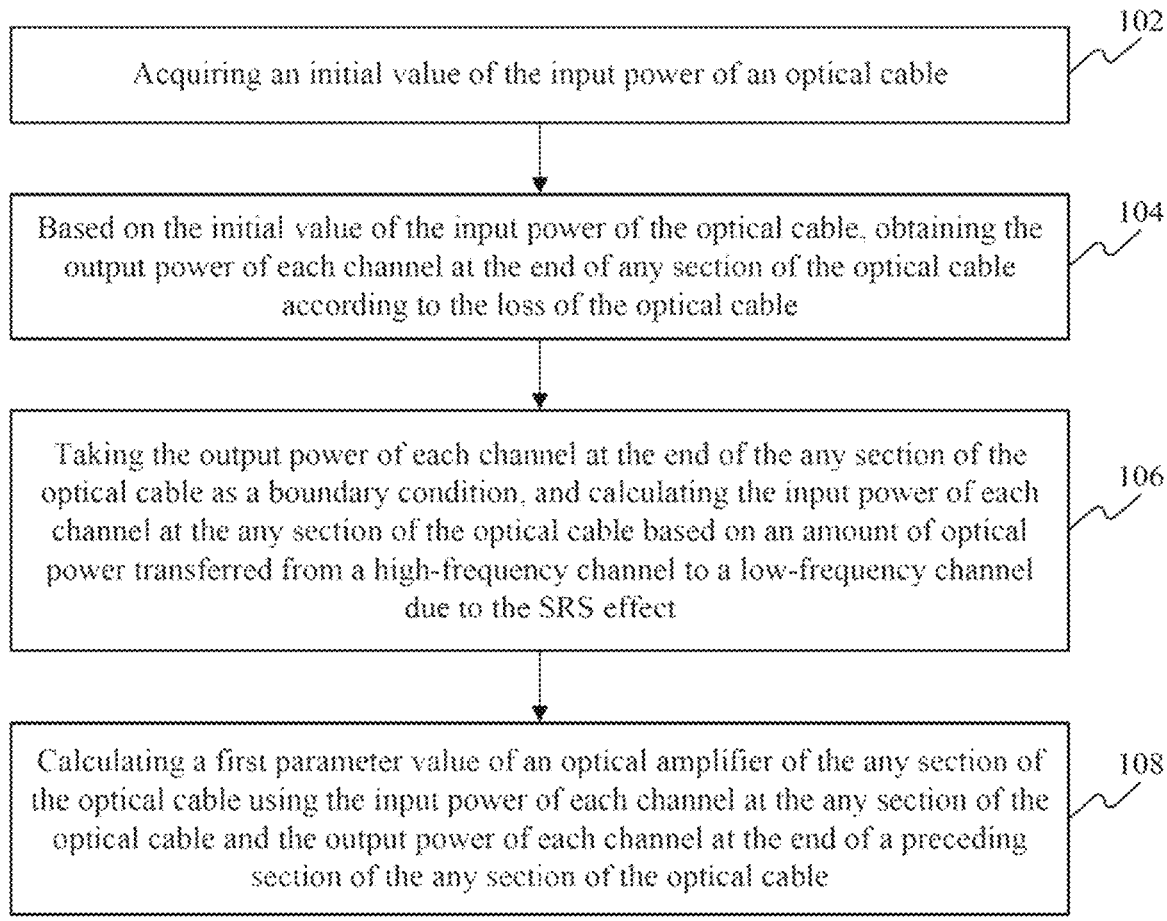
FIG. 1 is a flow chart of an exemplary method for calculating configuration of an optical transmission network according to some embodiments of this disclosure.

Numerous specific details are set forth in the following description in order to provide a thorough understanding of this disclosure. However, this disclosure can be implemented in many other ways different from those described herein, and those skilled in the art can make a similar extrapolation without departing from the connotation of this disclosure. Therefore, this disclosure is not limited by the specific implementations disclosed below.

The terms used in one or more embodiments of this disclosure are for the purpose of describing particular embodiments only, and are not intended to limit one or more embodiments of this disclosure. The singular forms "a," "said," and "the" used in one or more embodiments of this disclosure and the appended claims are also intended to include plural forms, unless other meanings are clearly indicated in the context. It should also be understood that the term "and/or" as used in one or more embodiments of this disclosure refers to and encompasses any or all possible combinations of one or more associated listed items.

It should be understood that although the terms first, second, etc. may be used to describe various information in one or more embodiments of this disclosure, the information should not be limited to these terms. These terms are only used to distinguish the same type of information from each other. For example, without departing from the scope of one or more embodiments of this disclosure, first may also be referred to as second, and similarly, the second may also be referred to as the first. Depending on the context, the word "if" as used herein may be interpreted as "at the time of" or "when" or "in response to determination."

As the band keeps evolving, and the transmission power and the transmission bandwidth increase, the optical power is transferred from high-frequency channels to low-frequency channels due to the SRS effect in an optical fiber during the operation of an optical transmission network, which degrades the performance of the system. Due to the SRS effect, local optical cable interruption and degradation not only affect the transmission items carried on the optical cable, but may also have an impact on the rest of the channels in the remaining network. In such a complex transmission network, how to calculate parameter configuration of an optical amplifier of an optical transmission network with superior performance and effectively reduce the items' impact range and time is a challenging problem.

On the basis of the above, a method for calculating configuration of an optical transmission network is provided in this disclosure, and this disclosure also relates to an apparatus and a system for calculating configuration of an optical transmission network, and to a computing device and a computer-readable storage medium, which will be described in detail one by one in the following embodiments. The method for calculating configuration of an optical transmission network provided in some embodiments incorporates the Stimulated Raman Scattering (SRS) effect into the calculation process for complex optical transmission networks by: firstly acquiring an initial value of the input power of an optical cable; based on the initial value of the input power of the optical cable, obtaining the output power of each channel at the end of any section of the optical cable according to the loss of the optical cable; taking the output power of each channel at the end of the section of the optical cable as a boundary condition to calculate the input power of each channel at the section of the optical cable based on an amount of optical power transferred from a high-frequency channel to a low-frequency channel due to the SRS effect; and then calculating a first parameter value of an optical amplifier of the section of the optical cable using the input power of each channel at the section of the optical cable and the output power of each channel at the end of a preceding section of the section of the optical cable. In this way, the corresponding optical amplifier is configured based on the first parameter value, so that each channel can clearly achieve the required fiber input power, overcome the damage caused by the SRS effect, and avoid the impact of local optical cable disruption and degradation on the transmission items carried on the optical cable or the impact thereof on the rest of the channels in the remaining network. Therefore, this method can quickly calculate and configure the required channel power, effectively reduce the impact range and time of the items, and optimize the system performance.

FIG. 1 shows a flow chart of an exemplary method for calculating configuration of an optical transmission network according to some embodiments of this disclosure, which includes step 102 to step 108.

In step 102, an initial value of the input power of an optical cable is acquired.

For example, in the step 102, the influence of the SRS can be temporarily ignored. The Gaussian Noise (GN) model is used in combination with the characteristics of the optical amplifier, the parameters of the optical cable, the number of channels and other information to calculate relatively optimized fiber input power of each section of the optical cable as the initial value of the input power. For example, the initial value of the input power can be given by algorithms such as Local Optimization leads to Global Optimization (LOGO, a method where local optimization is global optimization) or directly according to the empirical value. In this step, frequency correlation can be ignored, and the acquired initial value of the input power can be the average channel power. Therefore, the accuracy of the channel power is not required to be too high.

In step 104, based on the initial value of the input power of the optical cable, the output power of each channel at the end of any section of the optical cable is obtained according to the loss of the optical cable.

The method for determining the loss of the optical cable is not limited. For example, a loss coefficient of the optical cable can be used to obtain the loss of the optical cable according to the formula that the loss of the optical cable is equal to the product of the loss coefficient and the length of the section of the optical cable. The output power of each channel at the end of the optical cable can be obtained by subtracting the loss of the optical cable from the initial value of the input power.

In step 106, taking the output power of each channel at the end of the section of the optical cable as a boundary condition, the input power of each channel at the section of the optical cable is calculated based on the amount of optical power transferred from a high-frequency channel to a low-frequency channel due to the SRS effect.

The specific method for calculating the input power is not limited. For example, according to the SRS differential equation system that calculates the output power based on the SRS effect with the input power as the known condition, reverse thinking can be adopted, and it can be converted into reverse calculation which calculates the input power based on the SRS effect with the output power as the boundary condition, so as to calculate the input power. The expression of the SRS differential equation system is not limited, and can be specifically set according to the parameters required by the implementation scenario. For example, the SRS differential equation system can contain two expressions, one of which is an attenuation differential expression of the signal power attenuated along the transmission distance, and the other of which is a transfer differential expression of the optical power transferred from high-frequency channels to low-frequency channels. When reversely calculating the input power, the output power of each channel at the end of the section of the optical cable can be set as the boundary condition according to the expression of the SRS differential equation system, and then the input power of the section of the optical cable can be calculated reversely. The method for solving the differential equation system can be, for example, an iterative algorithm, including Newton's method, Runge-Kutta method, or the like.

In step 108, a first parameter value of an optical amplifier of the section of the optical cable is calculated using the input power of each channel at the section of the optical cable and the output power of each channel at the end of a preceding section of the section of the optical cable.

The method provided in the embodiments of this disclosure does not limit which specific types of parameters of the optical amplifier to calculate. For example, the gain and the slope are key parameters of the optical amplifier, and therefore, the first parameter value may include the first gain or the first slope. It can be understood that the gain and the slope of the optical amplifier of the section of the optical cable can be determined under the condition that the input power of each channel at the section of the optical cable and the output power of each channel at the end of a preceding section of the section of the optical cable are constant. For example, the ratio of the total input power of each channel at the section of the optical cable to the total output power of each channel at the end of a preceding section of the section of the optical cable can be regarded as the gain of the optical amplifier of the section of the optical cable. For another example, the slope of the optical amplifier can be determined by linearly fitting the gain of each channel of the section of the optical cable. Of course, the calculation method may adjust the parameters as required by the implementation scenario, which is not limited by the method provided in the embodiments of this disclosure.

In this method, considering that as the transmission power and the transmission bandwidth increase, the optical power is transferred from the high-frequency channel to the low-frequency channel due to the SRS effect in the optical fiber, and SRS-led damage is more severe, thereby degrading the performance of the system. Therefore, this method incorporates the SRS effect into the calculation process for complex optical transmission networks by: firstly acquiring an initial value of the input power of an optical cable; based on the initial value of the input power of the optical cable, obtaining the output power of each channel at the end of any section of the optical cable according to the loss of the optical cable; taking the output power of each channel at the end of the section of the optical cable as a boundary condition to calculate the input power of each channel at the section of the optical cable based on an amount of optical power transferred from a high-frequency channel to a low-frequency channel due to the SRS effect; and then calculating a first parameter value of an optical amplifier of the section of the optical cable using the input power of each channel at the section of the optical cable and the output power of each channel at the end of a preceding section of the section of the optical cable. In this way, the corresponding optical amplifier is configured based on the first parameter value, so that each channel can clearly achieve the required fiber input power, overcome the SRS effect, and avoid the impact of local optical cable disruption and degradation on the transmission items carried on the optical cable or the impact thereof on the rest of the channels in the remaining network. It can be seen that this method can quickly calculate and configure the required channel power, effectively reduce the items' impact range and time, and optimize system performance.

In order to make the method provided in the embodiments of this disclosure easier to understand, a specific implementation for calculating the input power of any section of an optical cable is described in detail below with reference to an example of a differential equation system.

For example, the step of taking the output power of each channel at the end of the section of the optical cable as a boundary condition to calculate the input power of each channel at the section of the optical cable based on an amount of optical power transferred from a high-frequency channel to a low-frequency channel due to the SRS effect may include: taking the output power of each channel at the end of the section of the optical cable as a boundary condition to solve a differential equation system for calculating the input power of the section of the optical cable to obtain the input power of the section of the optical cable. In some embodiments, the differential equation system includes an attenuation differential expression and a transfer differential expression. The attenuation differential expression is used to represent the amount of signal power attenuated along the transmission distance; and the transfer differential expression is used to represent the amount of optical power transferred from the high-frequency channel to the low-frequency channel due to the SRS effect. The transferred amount is determined according to the Raman gain coefficient, the optical fiber effective area, the signal power of each point of each channel at the end of the optical cable and the signal center frequency of each channel at the end of the optical cable. In some embodiments, the input power of the section of the optical cable can be accurately calculated through a differential equation system including the attenuation differential expression and the transfer differential expression.

Specifically, for example, the expression of the differential equation system for calculating the input power of the section of the optical cable is as follows:

$$\frac{\partial P_n^k(z)}{\partial z} = -\alpha P_n^k(z) + \sum_{m=1}^{N} \frac{g_R(\omega_m - \omega_n)}{A_{eff}} P_n^k(z) P_m^k(z)$$

where $-\alpha P_n^k(z)$ represents the attenuation differential expression, and $$\sum_{m=1}^{N} \frac{g_R(\omega_m - \omega_n)}{A_{eff}} P_n^k(z) P_m^k(z)$$

represents the transfer differential expression.

Here, a represents the attenuation coefficient, $g_R$, $A_{eff}$, $P_n^k(z)$, $\omega_n$ represent the Raman gain coefficient, the optical fiber effective area, the signal power of the n-th channel at point z of the k-th section of the optical cable, and the signal center frequency of the n-th channel, respectively.

On the basis of the obtained initial value of the input power of the optical cable, the power of the n-th channel at the end of the k-th section of the optical cable $P_n^k(z=L_k)$ is obtained according to the loss of the optical cable, and then the power is taken as the boundary condition to solve the above differential equation system. The power of the n-th channel at the end of the k-th section of the optical cable $P_n^k(z=L_k)$ is taken as the boundary condition, and the method for solving the differential equation system may be a conventional iterative algorithm of a differential equation system, including Newton's method, Grunge-Kutta method, etc., to calculate the input power of channel n at the k-th section of the optical cable $P_n^k(z=0)$.

In order to more accurately calculate the gain and slope of an optical amplifier of the section of the optical cable, in some embodiments of this disclosure, the calculating a first parameter value of the optical amplifier of the section of the optical cable using the input power of each channel at the section of the optical cable and the output power of each channel at the end of a preceding section of the section of the optical cable includes: obtaining a first gain of the optical amplifier according to a ratio of the total input power of each channel at the section of the optical cable to the total output power of each channel at the end of a preceding section of the section of the optical cable; determining a linear fitting slope by linearly fitting the gain of each channel of the section of the optical cable; and determining a first slope of the optical amplifier according to a product of the linear fitting slope and the gain width of the optical amplifier.

In some embodiments, the first gain is obtained by calculating the ratio of the total output power to the total input power of the optical amplifier. The calculation of the first slope is obtained by linearly fitting the gain (in the unit of dB) of each channel, and the final slope of the optical amplifier can be equal to the linear fitting slope multiplied by the gain width of the optical amplifier. For example, for the C-band-extension standard, the gain width is 4.8 THz. For example, the formulas for calculating the first gain $G^k$ and the first slope $T^k$ of the k-th amplifier are as follows:

$$G^k = \frac{\sum_n P_n^k(z=0)}{\sum_n P_n^{k-1}(z=L)}$$

$$T^k = LinearFittingSlope\left(\left\{\omega_n, 10*\log 10\left(\frac{P_n^k(z=0)}{P_n^{k-1}(z=L)}\right)\right\}\right) * BW$$

It should be noted that, in a C+L optical transmission network system, optical amplifiers in the C and L bands may be independent or may be the same physical device, which is not limited by the method provided in the embodiments of this disclosure. Calculations are performed separately for each optical amplifier.

In order to further optimize the calculated configuration, the method provided in the embodiments of this disclosure may further iteratively calculate the optimal gain and slope of each optical amplifier based on the result of the first parameter value, with the desired Generalized Signal to Noise Ratio (GSNR) as the goal. Specifically, the method may, for example, further include: calculating, with an iterative algorithm, a second parameter value (e.g., a second gain or a second slope) of the optical amplifier of the section of the optical cable under the condition that an objective function of a noise calculation model including the SRS effect achieves an optimization goal, wherein the optimization goal is to maximize a minimum value of the GSNR of each channel of the section of the optical cable, and an input to a first iteration of the objective function includes the first parameter value, e.g., the first gain and the first slope.

In some embodiments, since the basic GN model does not consider the SRS effect, in order to obtain a more accurate (closer to the actual) GSNR, a calculation model including the SRS effect needs to be introduced. For example, one implementation is based on the ISRSGN model. Therefore, in some embodiments, the optimal parameter value of each optical amplifier may further be iteratively calculated based on the first parameter value, with the desired GSNR as the goal.

The specific method for determining whether the objective function reaches the convergence condition of the optimization goal is not limited in this disclosure. For instance, a threshold judgment mode can be used, for example, the function value of the objective function is greater than a certain threshold; or a relative mode can be used, for example, two or more consecutive fluctuations are smaller than a certain threshold.

Figure 2:
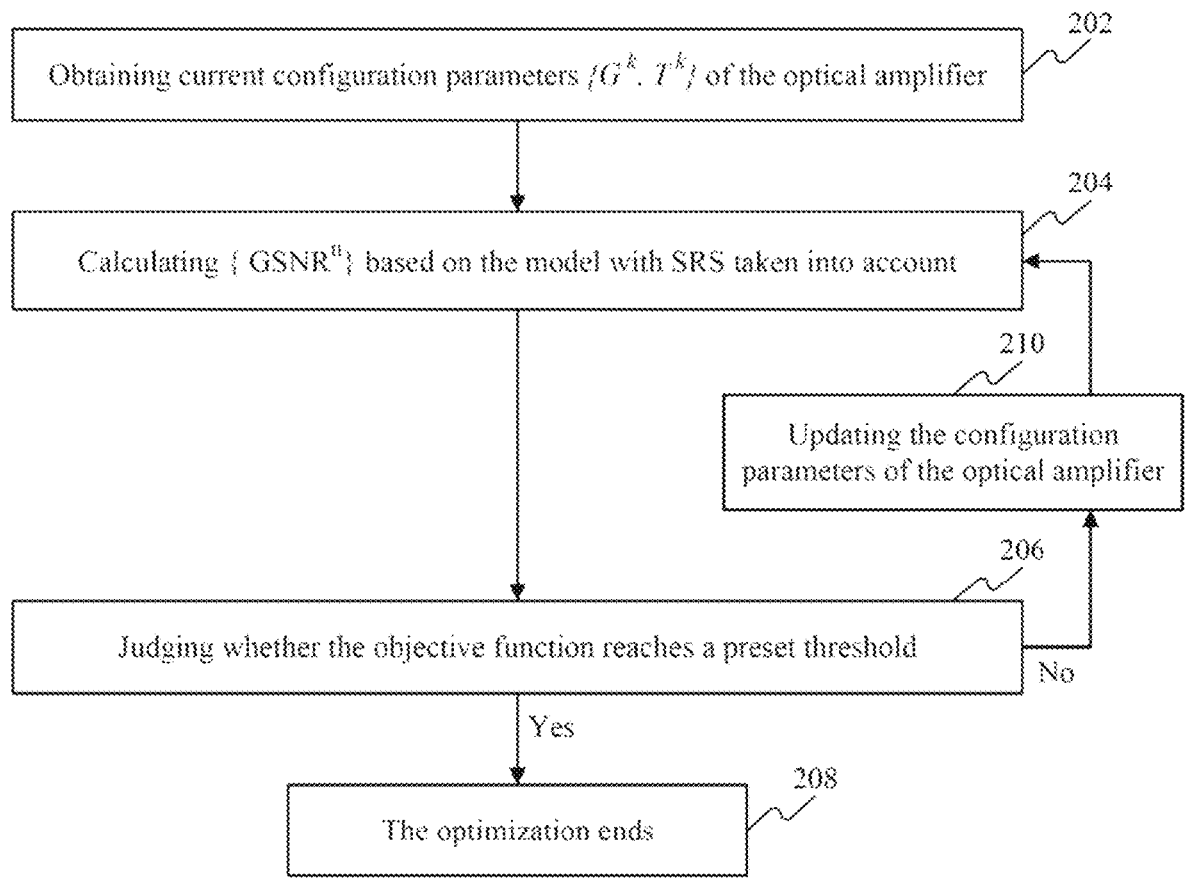
FIG. 2 is a schematic diagram of an exemplary Generalized Signal to Noise Ratio (GSNR) based optimization process according to some embodiments of this disclosure.

For example, in some embodiments, a preset threshold can be set, so as to determine whether the optimization goal is achieved according to the preset threshold. The specific process is as shown in the schematic diagram of an exemplary GSNR-based optimization process shown in FIG. 2, which may include steps 202, 204, 206, 208, and 210.

In step 202, current configuration parameters of the optical amplifier, i.e., the first gain and the first slope, are obtained. That is, the configuration parameter $\{G^k, T^k\}$ of the optical amplifier in the first iteration is obtained, where $G^k$ represents the first gain and $T^k$ represents the first slope.

In step 204, the function value of the objective function of the noise calculation model including the SRS effect is calculated. That is, the receiving end $\{GSNR^n\}$ is calculated based on the model considering the SRS.

In step 206, it is determined whether the objective function reaches a preset threshold.

In step 208, if the objective function reaches the preset threshold (step 206—yes), the optimization ends, and the current configuration parameters of the optical amplifier are optimized second gain and second slope.

In step 210, if the objective function does not reach the preset threshold (step 206—no), the configuration parameters of the optical amplifier are updated. That is, $\{G^k, T^k\}$ is updated, and step 204 is re-entered so as to calculate the objective function based on the updated $\{G^k, T^k\}$ in the next iteration.

The method provided in the embodiments of this disclosure does not limit the specific implementations of how to calculate the gain and the slope of the next iteration. For example, given the objective function, the figure of merit, that is, the gain and slope of each optical amplifier, can be calculated by iterative algorithms such as the gradient method and Newton's method.

For example, in one or more embodiments, the calculating, with an iterative algorithm, a second parameter value of the optical amplifier of the section of the optical cable under the condition that an objective function of a noise calculation model including the SRS effect achieves an optimization goal may include: taking the first parameter value as a current configuration of parameters of the optical amplifier; determining whether the function value of the objective function achieves the optimization goal under the current configuration; in response to a determination that the optimization goal is achieved under the current configuration, taking the parameter value of the current configuration as the second parameter value; in response to a determination that the optimization goal is not achieved under the current configuration, calculating a derivative of each variable of the objective function with respect to the parameter under the current configuration; using the derivative of each variable with respect to the parameter, calculating a derivative of the objective function with respect to variation of the parameter of each variable; calculating a parameter adjustment step size according to a preset step size coefficient and the derivative of the objective function with respect to the variation of the parameter of each variable; calculating a parameter value for next iteration according to the parameter adjustment step size; updating the parameter value for the next iteration to the current configuration of the parameter; and returning to the step of determining whether the function value of the objective function achieves the optimization goal under the current configuration.

In some embodiments, the variation of parameters such as the gain and the slope of the objective function of each variable is evaluated by calculating the derivative of each variable under the current optical amplifier configuration, so as to combine the calculated derivative and the preset step size coefficient, to get relatively accurate parameter values that can be used in the next iteration.

It should be noted that, the method provided in the embodiments of this disclosure does not limit the specific expression of the objective function. In some embodiments, the optimization goal is to maximize the minimum value of the GSNR of each channel, and it is generally considered that the higher the mean value of the GSNR of each channel, the better, and the lower the standard deviation of the GSNR of each channel, the better. Therefore, the principle of constructing the expression of the objective function in one or more embodiments of this disclosure includes: the function value of the objective function is positively correlated with the mean value of the GSNR of each channel, and negatively correlated with the standard deviation of the GSNR of each channel.

With reference to the above embodiments, a relatively ideal objective function J can be expressed as follows:

$$J = m_L - \sigma_L + m_C - \sigma_C$$

where $m_C$ and $m_L$ represent the mean value of the GSNRs of the C and L-band channels, respectively, and $\sigma_C$ and $\sigma_L$ represent the standard deviation of the GSNRs of the C and L-band channels, respectively.

Below, with reference to the example of the above expression of objective function J, the calculating, with an iterative algorithm, the second gain and the second slope of the optical amplifier of the section of the optical cable under the condition that an objective function of a noise calculation model including the SRS effect achieves the optimization goal is explained in more detail.

In step 1, the derivative of each variable under the current optical amplifier configuration is calculated.

For example:

$$\frac{\partial m_{L(C)}}{\partial G_{L(C),k}}, \frac{\partial m_{L(C)}}{\partial T_{L(C),k}}, \frac{\partial \sigma_{L(C)}}{\partial G_{L(C),k}}, \frac{\partial \sigma_{L(C)}}{\partial T_{L(C),k}},$$

represent the derivative of the mean value of C-band or L-band GSNR with respect to the gain of the k-th C-band or L-band optical amplifier, respectively, the derivative of the mean value of C-band or L-band GSNR with respect to the slope of the k-th C-band or L-band optical amplifier, the derivative of the standard deviation of the C-band or L-band GSNR with respect to the gain of the k-th C-band or L-band optical amplifier, and the derivative of the standard deviation of the C-band or L-band GSNR with respect to the slope of the k-th C-band or L-band optical amplifier.

In step 2, the derivatives of the objective function to each parameter, $$\frac{\partial J}{\partial G_{L(C),k}} \text{ and } \frac{\partial J}{\partial T_{L(C),k}}$$

can be obtained using the derivatives calculated in the previous step.

In step 3, according to the preset step size coefficient μ and the following formula, the amplifier configuration values required for the next iteration, that is, the updated gain and slope, can be obtained.

$$G_{L(C),k}^{(n+1)} = G_{L(C),k}^{(n)} + \mu \frac{\partial J}{\partial G_{L(C),k}}$$

$$T_{L(C),k}^{(n+1)} = T_{L(C),k}^{(n)} + \mu \frac{\partial J}{\partial T_{L(C),k}}$$

In step 4, the new objective function value can be obtained using the updated amplifier configuration values and the calculation model including the SRS effect.

In step 5, it is determined whether the objective function satisfies the convergence condition. If the convergence condition is not satisfied, the first step is re-entered to calculate each derivative based on the updated gain and slope. If the convergence condition is satisfied, the final result is outputted. That is, the objective function reaches the second gain and the second slope of the optimization goal.

In order to further improve the system performance, the method provided in the embodiments of this disclosure can further optimize the configuration by feeding back the device performance interactively with the device. Specifically, in some embodiments, the method may further include: configuring the calculated parameter value (e.g., the first gain and the first slope, or the second gain and the second slope) to the corresponding optical amplifier, and acquiring first performance data of an electrical layer device under the configuration; adjusting the parameter value to obtain an adjusted third parameter value; configuring the third parameter value to the corresponding optical amplifier, and acquiring second performance data of the electrical layer device under the configuration; calculating variation of a function value of a device performance optimization function respectively in the case of the configuration corresponding to the first performance data and in the case of the configuration corresponding to the second performance data; and determining, according to the variation of the function value of the device performance optimization function, whether a convergence condition is satisfied; in response to a determination that the convergence condition is satisfied, determining that the parameter value of a final configuration of the corresponding optical amplifier is obtained; and in response to a determination that the convergence condition is not satisfied, calculating a parameter adjustment value according to the variation of the function value of the device performance optimization function, calculating a fourth parameter value of the corresponding optical amplifier according to the parameter adjustment value, and taking the fourth parameter value as a recalculated parameter value, and returning to the step of configuring the calculated parameter value to the corresponding optical amplifier and acquiring the first performance data of the electrical layer device under the configuration.

In some embodiments, due to the existence of factors such as the uncertainty of cable loss distribution, the difference between physical characteristics of the optical amplifier and the model, and the inconsistency between electrical layer devices such as transceivers, etc. in practical applications, actual physical performance of the devices may differ from those using the GN model (or the ISRSGN model with SRS taken into account). In order to obtain more accurate configurations, the current configuration can be modified using the interactive information between the network management system and the device.

For example, the corresponding gain and slope can be calculated for each optical amplifier in the optical transmission network in turn, and after all optical amplifiers are configured, the optimized configuration applying interactive device performance feedback is entered. Specifically, for example, a corresponding first gain and first slope can be calculated for each optical amplifier according to the above embodiments, and after the first gain and the first slope are configured to the optical amplifier, feedback optimization is performed on the basis of them. Alternatively, a corresponding second gain and second slope can be calculated for each optical amplifier according to the above embodiments, and after the second gain and the second slope are configured to the optical amplifier, feedback optimization is performed on the basis of them. It can be understood that, since the second gain and the second slope are optimal configurations calculated using the noise calculation model including the SRS effect under the condition that the optimization goal is achieved, feedback optimization performed based on the second gain and the second slope can achieve optimal configuration of the system performance more quickly.

Figure 3:
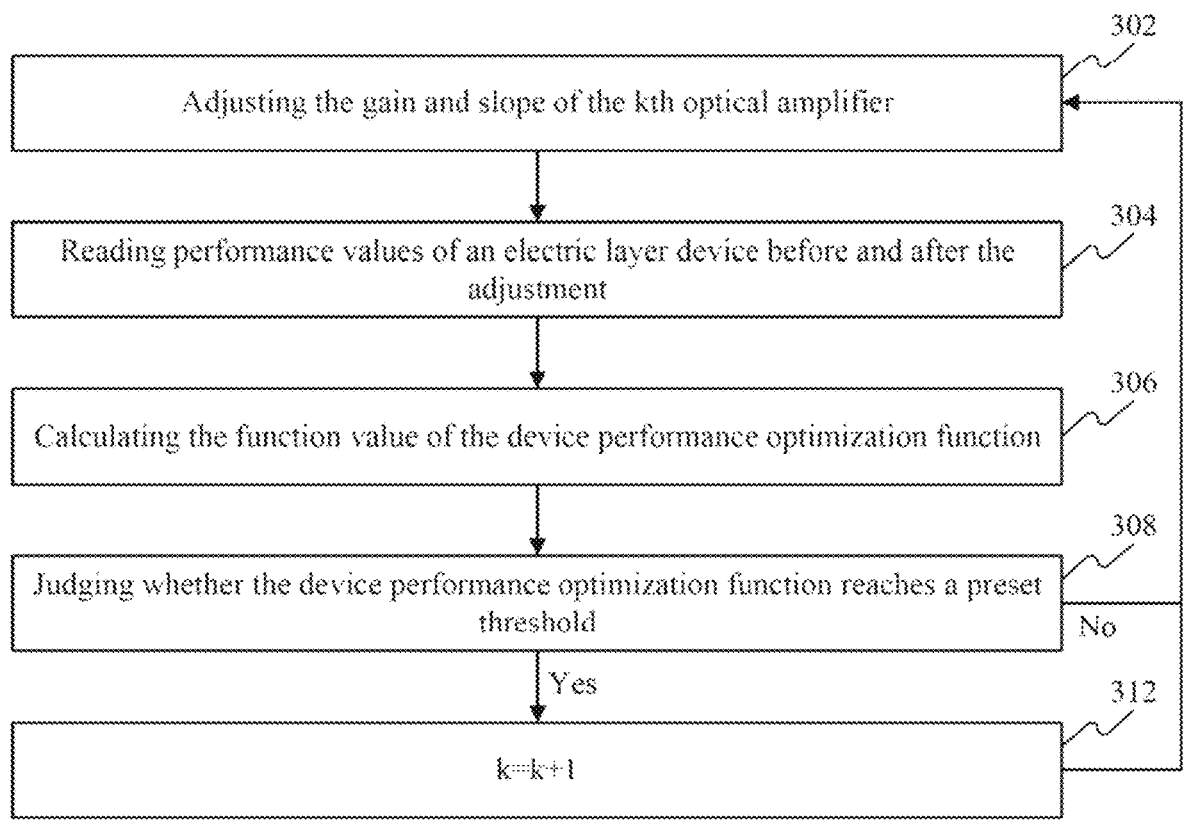
FIG. 3 is a schematic diagram of an exemplary feedback optimization process according to some embodiments of this disclosure.

In order to make the above embodiments easier to understand, the following describes in detail the process of modifying the current configuration between the network management system and the device based on the interaction information with reference to the schematic diagram of an exemplary feedback optimization process shown in FIG. 3. As shown in FIG. 3, the feedback optimization process includes steps 302, 304, 306, 308, and 312.

In step 302, the gain and slope of the k-th optical amplifier (OA) are adjusted.

In step 304, performance values of an electrical layer device before and after the adjustment are read.

In step 306, the function value of the device performance optimization function is calculated.

In step 308, it is determined whether the device performance optimization function reaches a preset threshold.

If the preset threshold is not reached (step 308—no), step 302 is re-entered to update the gain and slope of the k-th optical amplifier.

In step 312, if the preset threshold is reached (step 308—yes), k=k+1 is set to move to the next OA for such iterative optimization.

The configuration is not completed until all OAs are finally optimized.

For example, the network management system (NMS) may sequentially configure the OAs in the network after obtaining the first gain and the first slope, or the second gain and the second slope. After the configuration is completed, in order to achieve better performance, it is possible to continue to enter the optimization process shown in FIG. 3. Minor modifications are made to the configuration of the k-th OA, such as an increase or decrease of 0.5 dB to the gain, and an increase or decrease of 0.3 dB to the slope. The NMS then obtains the performance of the electrical layer device before and after the configuration. The performance acquisition here can be the NMS actively querying from the device, or the device actively pushing to the NMS by means of long-distance measurement technology or the like. According to the modified configuration value and the performance fluctuation before and after the configuration, the variation of the current device performance optimization function can be calculated. The performance here can be parameters with proven performance, such as Q value, SNR, etc. The specific method for constructing the device performance optimization function is not limited. For example, it can be constructed according to the average value of the Q values of each electrical layer minus the standard deviation of the Q values, or the average value of the SNRs minus the standard deviation of the SNRs. According to the variation of the device performance optimization function, the next adjustment can be calculated, for example, increasing or decreasing the gain, or increasing or decreasing the slope. According to the calculated adjustment and step size (for example, a gain step size of 0.2 dB, and a slope step size of 0.1 dB), the configuration of the k-th OA is further adjusted. When the device performance optimization function satisfies a preset threshold, the process moves to the next OA to perform such iterative optimization until the configuration is finally completed.

Figure 4:
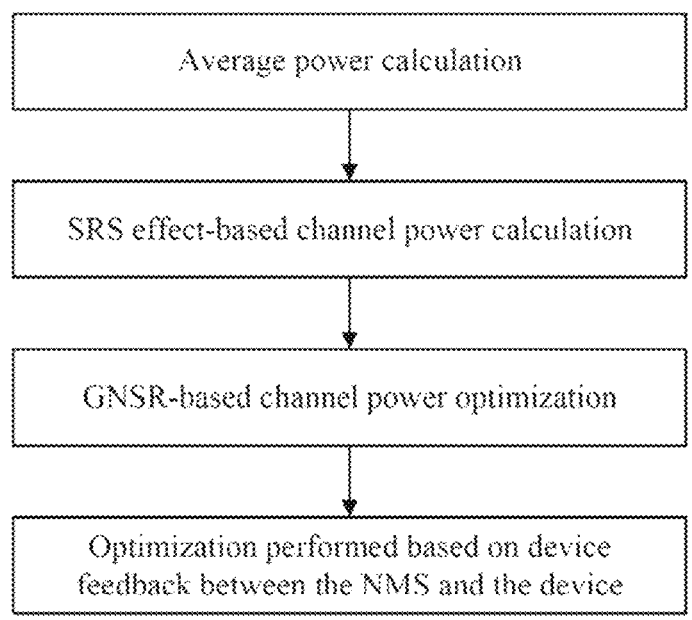
FIG. 4 is a schematic diagram of an exemplary feedback optimization process according to some other embodiments of this disclosure.

For example, taking the performance optimization through interactive feedback based on the second parameter value as an example, as shown in the schematic diagram of another exemplary feedback optimization process in FIG. 4, it is possible to first calculate the average power to get the initial value of the input power, then calculate the first gain and the first slope with SRS effect-based channel power, and then perform GSNR-based channel power optimization based on the first gain and the first slope to get the second gain and the second slope. After the NMS delivers the configuration, real-time optimization and tracking are performed based on the device feedback between the NMS and the device, so as to realize rapid calculation and rapid adjustment of the optimized channel power configuration of the optical transmission network system, thereby effectively reducing the impact range and time of the items.

In one or more embodiments of this disclosure, the method provided in the embodiments of this disclosure can be applied to calculate the configuration of a C+L optical transmission network. The method according to the embodiments of this disclosure may overcome SRS-led damage while improving the transmission capacity of the optical fiber by relying on the C+L band, so as to fully optimize the channel power configuration of the optical transmission network system.

It should be noted that, in a Dense Wavelength Division Multiplexing system (DWDM), the performance of end-to-end items is limited by a variety of factors, and the method provided in the embodiments of this disclosure can combine with any other methods to optimize the configuration.

For example, the first type of limitation is that Amplifier Spontaneous Emission (ASE) noise introduced by optical amplifiers and nonlinear noise caused by the Kerr effect are the two main sources of noise. The second type of limitation is that Chromatic Dispersion (CD), Polarization Dependent Loss (PDL), Polarization Mode Dispersion (PMD) and other transmission effects will cause additional damage to the signal, such as waveform distortion, polarization state coupling and so on.

With the development of related technologies and the popularization of Dispersion Compensation Fiber-Free (DCF-Free) links, signal distortion of the second type can be compensated to a large extent, and generally does not constitute a limiting factor to the system. At the same time, thanks to the accurate modeling of nonlinear noise of optical fiber by the GN model, the impact of noise of the first type on the system can be largely evaluated at the planning stage. For example, the GSNR after system transmission can be used as the basis for determining the performance. Optimizing the fiber input power can be equivalent to solving the problem of optimizing the fiber input power of each section of an optical cable. A global optimization problem is transformed into several local optimization problems, and this kind of planning problem is solved in combination with the GN model and LOGO algorithm.

For another example, the third type of limitation is the non-ideal characteristics of the equipment and the device themselves. The transmitter and the receiver themselves will also introduce a certain performance cost in the back-to-back scenario, which is difficult to compensate and accurately evaluate. Therefore, in practical applications, a certain margin can be reserved to ensure the availability of the system according to specific disclosures of a certain type of device and probability distribution of the cost.

In order to fully optimize the configuration of all optical amplifiers in the entire optical transmission network, the method can be applied to the management terminal that interacts with each network node of the optical transmission network. Each network node has its own optical amplifier, and each network node is interconnected with one another through an optical multiplex section. Furthermore, each optical amplifier is sequentially configured according to the method provided in one or more embodiments of this disclosure. Specifically, for example, the method may further include: configuring the parameter value of the final configuration such as the final gain and the final slope to the corresponding optical amplifier under the condition that the parameter value of the final configuration of the optical amplifier of the section of the optical cable is determined; and in response to an optical amplifier being unconfigured, for a section of the optical cable of the unconfigured optical amplifier, re-entering the step of acquiring the initial value of the input power of the optical cable.

Figure 5:
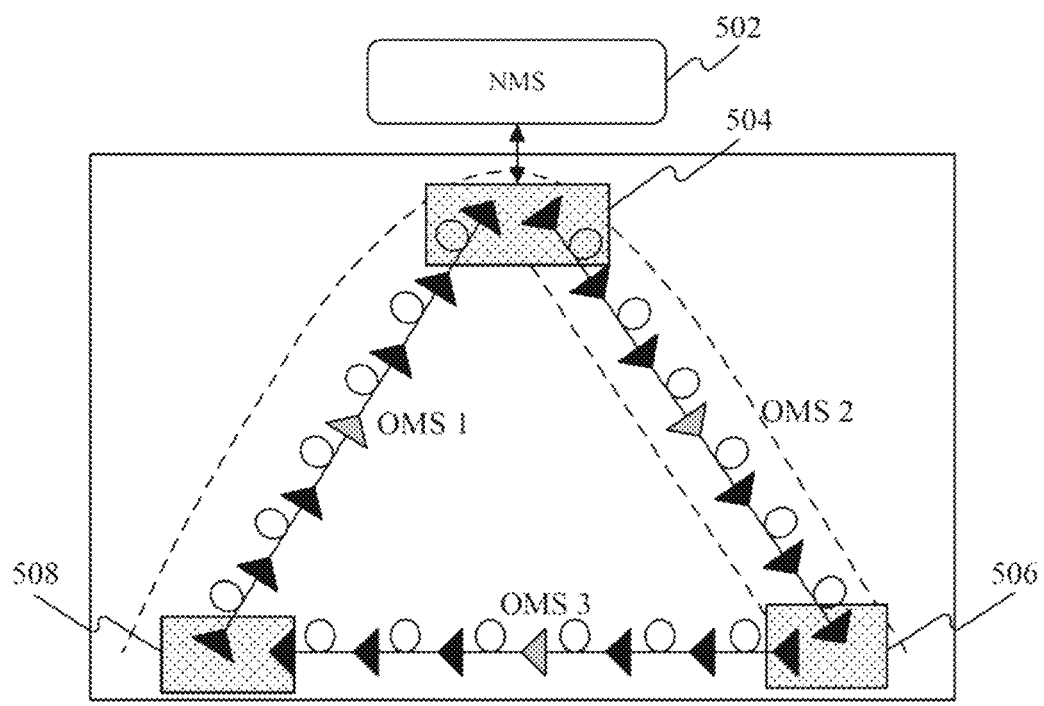
FIG. 5 is a schematic structural diagram of an optical transmission network system according to some embodiments of this disclosure.

Corresponding to the above method embodiments, this disclosure also provides optical transmission network system embodiments. FIG. 5 shows a schematic structural diagram of an exemplary optical transmission network system provided in some embodiments of this disclosure. As shown in FIG. 5, the system includes management terminal 502 and various network nodes interacting with the management terminal 502, such as network node 504, network node 506, network node 508 and so on. Each network node has its own optical amplifier, and each network node is interconnected with one another through an optical multiplex section.

The management terminal 502 can be configured to apply the method for calculating configuration of an optical transmission network according to any embodiments of this disclosure, to calculate a parameter value of the optical amplifier of any section of the optical cable, and configure the parameter value to the corresponding optical amplifier.

The optical amplifier can be configured to set parameters according to the configuration of the management terminal.

According to the optical transmission network implemented in some embodiments, several network nodes are interconnected with one another through the Optical Multiplex Section (OMS), and different item channels have different OMS paths. Both the configuration of all devices and the control of channel power can be managed by an upper-layer management terminal NMS in a unified manner.

Figure 6:
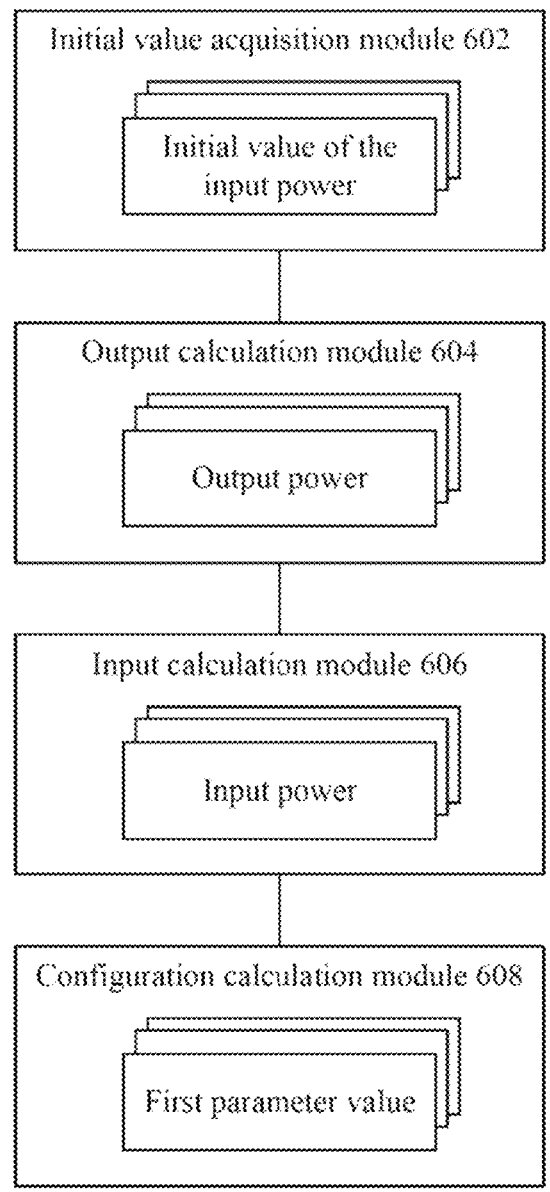
FIG. 6 is a schematic structural diagram of an exemplary apparatus for calculating configuration of an optical transmission network according to some embodiments of this disclosure.

Corresponding to the above method embodiments, this disclosure also provides apparatus embodiments for calculating configuration of an optical transmission network. FIG. 6 shows a schematic structural diagram of an exemplary apparatus for calculating configuration of an optical transmission network according to some embodiments of this disclosure. As shown in FIG. 6, the apparatus includes initial value acquisition module 602, output calculation module 604, input calculation module 606 and configuration calculation module 608.

The initial value acquisition module 602 can be configured to acquire an initial value of the input power of an optical cable.

The output calculation module 604 can be configured to obtain, based on the initial value of the input power of the optical cable, the output power of each channel at the end of any section of the optical cable according to the loss of the optical cable.

The input calculation module 606 can be configured to take the output power of each channel at the end of the section of the optical cable as a boundary condition, and calculate the input power of each channel at the section of the optical cable based on the amount of optical power transferred from a high-frequency channel to a low-frequency channel due to the SRS effect.

The configuration calculation module 608 can be configured to calculate a first parameter value of an optical amplifier of the section of the optical cable using the input power of each channel at the section of the optical cable and the output power of each channel at the end of a preceding section of the section of the optical cable.

This apparatus incorporates the SRS effect into the calculation process for complex optical transmission networks by: firstly acquiring an initial value of the input power of an optical cable; based on the initial value of the input power of the optical cable, obtaining the output power of each channel at the end of any section of the optical cable according to the loss of the optical cable; taking the output power of each channel at the end of the section of the optical cable as a boundary condition to calculate the input power of each channel at the section of the optical cable based on an amount of optical power transferred from a high-frequency channel to a low-frequency channel due to the SRS effect; and then calculating a first parameter value of an optical amplifier of the section of the optical cable using the input power of each channel at the section of the optical cable and the output power of each channel at the end of a preceding section of the section of the optical cable. In this way, the corresponding optical amplifier is configured based on the first parameter value, so that each channel can clearly achieve the required fiber input power, overcome the SRS effect, and avoid the impact of local optical cable disruption and degradation on the transmission items carried on the optical cable or the impact thereof on the rest of the channels in the remaining network. It can be seen that this apparatus can quickly calculate and configure the required channel power, effectively reduce the impact range and time of the items, and optimize the system performance.

Figure 7:
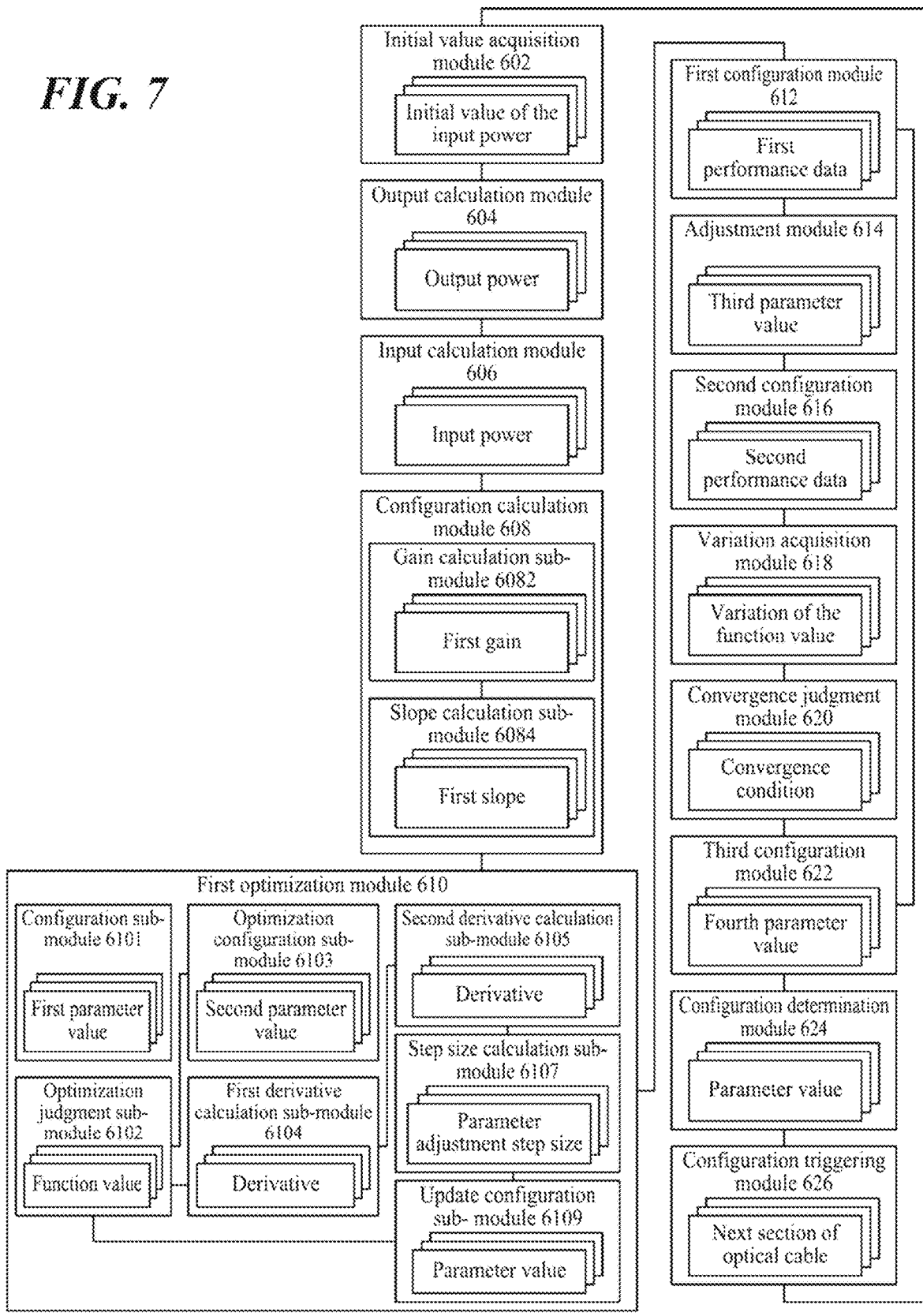
FIG. 7 is a schematic structural diagram of an exemplary apparatus for calculating configuration of an optical transmission network according to some other embodiments of this disclosure.

FIG. 7 shows a schematic structural diagram of an exemplary apparatus for calculating configuration of an optical transmission network according to some other embodiments of this disclosure. As shown in FIG. 7, the apparatus may further include a first optimization module 610.

The first optimization module 610 can be configured to calculate, with an iterative algorithm, a second parameter value (for example, the second parameter value can include a second gain or a second slope) of the optical amplifier of the section of the optical cable under the condition that an objective function of a noise calculation model including the SRS effect achieves an optimization goal. The optimization goal is to maximize a minimum value of the GSNR of each channel of the section of the optical cable, and the input to the first iteration of the objective function includes the first parameter value.

In some embodiments, considering that the basic GN model does not take the SRS effect into account, in order to obtain a more accurate (closer to the actual) GSNR, a calculation model including the SRS effect is introduced. For example, one implementation can be based on the ISRSGN model. Therefore, in some embodiments, the optimal gain and slope of each optical amplifier can further be iteratively calculated based on the first parameter value, with the desired GSNR as the goal.

In order to further improve the system performance, the method provided in the embodiments of this disclosure can further optimize the configuration by feeding back the device performance interactively with the device. Specifically, in some embodiments, the apparatus may further include a first configuration module 612, an adjustment module 614, a second configuration module 616, a variation acquisition module 618, a convergence judgment module 620, and a third configuration module 622.

The first configuration module 612 can be configured to configure the calculated parameter value to the corresponding optical amplifier, and acquire first performance data of an electrical layer device under the configuration.

The adjustment module 614 can be configured to adjust the parameter value to obtain an adjusted third parameter value.

The second configuration module 616 can be configured to configure the third parameter value to the corresponding optical amplifier, and acquire second performance data of the electrical layer device under the configuration.

The variation acquisition module 618 can be configured to calculate the variation of a function value of a device performance optimization function respectively in the case of the configuration corresponding to the first performance data and in the case of the configuration corresponding to the second performance data.

The convergence judgment module 620 can be configured to determine whether the convergence condition is satisfied according to the variation of the function value of the device performance optimization function, and if the convergence condition is satisfied, determine that the parameter value of the final configuration of the corresponding optical amplifier is obtained.

The third configuration module 622 can be configured to, if the convergence judgment module 620 determines that the convergence condition is not satisfied, calculate a parameter adjustment value according to the variation of the function value of the device performance optimization function, calculate a fourth parameter value of the corresponding optical amplifier according to the parameter adjustment value, and take the fourth parameter value as a recalculated parameter value, and trigger the first configuration module 612 again to perform the step of configuring the calculated parameter value to the corresponding optical amplifier and acquiring the first performance data of the electrical layer device under the configuration.

In some embodiments, due to the existence of factors such as the uncertainty of cable loss distribution, the difference between physical characteristics of the optical amplifier and the model, and the inconsistency between electrical layer devices such as transceivers, etc., in practical applications, actual physical performance of the devices may differ from those using the GN model (or the ISRSGN model with SRS taken into account). In order to obtain more accurate configurations, the current configuration can be modified using the interactive information between the network management system and the device.

In one or more embodiments of this disclosure, the input calculation module 606 can be configured to take the output power of each channel at the end of the section of the optical cable as a boundary condition to solve a differential equation system for calculating the input power of the section of the optical cable to obtain the input power of the section of the optical cable. In some embodiments, the differential equation system includes an attenuation differential expression and a transfer differential expression. The attenuation differential expression is used to represent the amount of signal power attenuated along a transmission distance. The transfer differential expression is used to represent the amount of optical power transferred from the high-frequency channel to the low-frequency channel due to the SRS effect. The transferred amount is determined according to the Raman gain coefficient, the optical fiber effective area, the signal power of each point of each channel at the end of the optical cable and the signal center frequency of each channel at the end of the optical cable. In some embodiments, the input power of the section of the optical cable can be accurately calculated through the differential equation system including the attenuation differential expression and the transfer differential expression.

It should be noted that, in the method provided in the embodiments of this disclosure, the specific calculation method of the configuration calculation module 608 may include the adjustment of the parameters as required by the implementation scenario, which is not limited by the method provided in the embodiments of this disclosure. For example, in one or more embodiments of this disclosure, as shown in FIG. 7, the configuration calculation module 608 may include a gain calculation sub-module 6082 and a slope calculation sub-module 6084.

The gain calculation sub-module 6082 can be configured to obtain a first gain of the optical amplifier according to the ratio of the total input power of each channel at the section of the optical cable to the total output power of each channel at the end of a preceding section of the section of the optical cable.

The slope calculation sub-module 6084 can be configured to determine the linear fitting slope by linearly fitting the gain of each channel of the section of the optical cable, and determine the first slope of the optical amplifier according to the product of the linear fitting slope and the gain width of the optical amplifier.

In one or more embodiments of this disclosure, the construction principle of an expression of the objective function is that the function value of the objective function is positively correlated with the mean value of the GSNR of each channel, and negatively correlated with the standard deviation of the GSNR of each channel.

In one or more embodiments of this disclosure, as shown in FIG. 7, the first optimization module 610 may include a configuration sub-module 6101, an optimization judgment sub-module 6102, an optimization configuration sub-module 6103, a first derivative calculation sub-module 6104, a second derivative calculation sub-module 6105, a step size calculation sub-module 6107, and an update configuration sub-module 6109.

The configuration sub-module 6101 can be configured to take the first parameter value as a current configuration of parameters of the optical amplifier.

The optimization judgment sub-module 6102 can be configured to determine whether the function value of the objective function achieves the optimization goal under the current configuration.

The optimization configuration sub-module 6103 can be configured to take the parameter value of the current configuration as the second parameter value if the optimization judgment sub-module 6102 determines that the optimization goal is achieved.

The first derivative calculation sub-module 6104 can be configured to calculate the derivative of each variable of the objective function with respect to the parameter under the current configuration if the optimization judgment sub-module 6102 determines that the optimization goal is not achieved. For example, the derivative of each variable of the objective function with respect to the gain and the derivative thereof with respect to the slope under the current configuration are calculated.

The second derivative calculation sub-module 6105 can be configured to calculate a derivative of the objective function with respect to variation of the parameter of each variable using the derivative of each variable with respect to the parameter.

The step size calculation sub-module 6107 can be configured to calculate a parameter adjustment step size according to a preset step size coefficient and the derivative of the objective function with respect to the variation of the parameter of each variable. For example, a gain adjustment step size is calculated according to a preset step size coefficient and the derivative of the objective function with respect to variation of the gain of each variable. As another example, a slope adjustment step size can be calculated according to a preset step size coefficient and the derivative of the objective function with respect to variation of the slope of each variable.

The update configuration sub-module 6109 can be configured to calculate a parameter value for next iteration according to the parameter adjustment step size. For example, the gain and the slope of the next iteration are calculated according to the gain adjustment step size and the slope adjustment step size, and the gain and the slope of the next iteration are updated to the current configuration. The parameter value for the next iteration is updated to the current configuration of the parameter, and the optimization judgment sub-module 6102 is triggered to perform the step of determining whether the function value of the objective function reaches the optimization goal under the current configuration.

In order to fully optimize the configuration of all optical amplifiers in the entire optical transmission network, the apparatus can be configured in the management terminal interacting with each network node of the optical transmission network. Each network node has its own optical amplifier, and each network node is interconnected with one another through an optical multiplex section. Furthermore, each optical amplifier is sequentially configured according to the apparatus provided in one or more embodiments of this disclosure. Specifically, for example, as shown in FIG. 7, the apparatus may further include a configuration determination module 624 and a configuration triggering module 626.

The configuration determination module 624 can be configured to configure the parameter value of the final configuration to the corresponding optical amplifier under the condition that the parameter value of the final configuration of the optical amplifier of the section of the optical cable is determined.

The configuration triggering module 626 can be configured to trigger, in response to an optical amplifier being unconfigured, the initial value acquisition module 602 to re-enter the step of acquiring the initial value of the input power of the optical cable for the next section of the optical cable of the unconfigured optical amplifier.

The above is a schematic solution of an exemplary apparatus for calculating configuration of an optical transmission network according to some embodiments. It should be noted that the technical solution of the apparatus for calculating the configuration of the optical transmission network and the technical solution of the above-mentioned method for calculating the configuration of the optical transmission network belong to the same or similar concept. For the detailed contents that are not described in the technical solution of the apparatus for calculating the configuration of the optical transmission network, reference can be made to the description of the technical solution of the above-mentioned methods for calculating the configuration of the optical transmission network.

Figure 8:
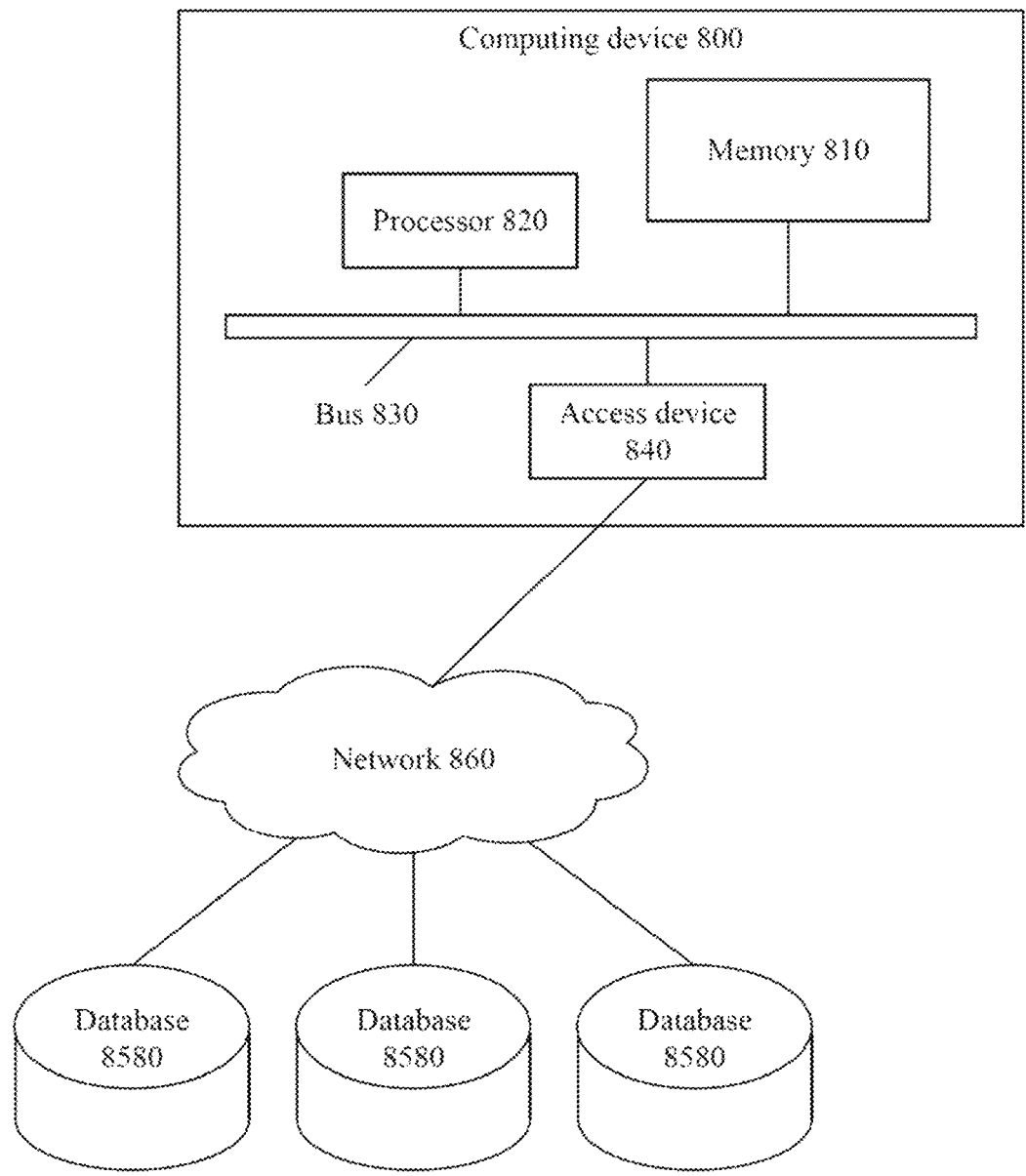
FIG. 8 is a structural block diagram of an exemplary computing device according to some embodiments of this disclosure.

FIG. 8 shows a structural block diagram of an exemplary computing device 800 according to some embodiments of this disclosure. Components of the computing device 800 include, but are not limited to, a memory 810 and a processor 820. The processor 820 is connected with the memory 810 through a bus 830, and a database 850 is used for storing data.

The computing device 800 also includes an access device 840 that enables the computing device 800 to communicate via one or more networks 860. Examples of such networks include a Public Switched Telephone Network (PSTN), a Local Area Network (LAN), a Wide Area Network (WAN), a Personal Area Network (PAN), or a combination of communication networks such as the Internet. The access device 840 may include one or more of any type of network interface (e.g., Network Interface Card (NIC)), wired or wireless, such as IEEE 802.11 Wireless Local Area Network (WLAN) wireless interface, World Interoperability for Microwave Access (Wi-MAX) interface, Ethernet interface, Universal Serial Bus (USB) interface, cellular network interface, Bluetooth interface, Near Field Communication (NFC) interface, etc.

In some embodiments of this disclosure, the above-mentioned components of the computing device 800 and other components not shown in FIG. 8 may also be connected to each other through, for example, a bus. It should be understood that the structural block diagram of the computing device 800 shown in FIG. 8 is only an example, and does not limit the scope of this disclosure. Those skilled in the art can add or replace other components as required.

The computing device 800 may be any type of stationary or mobile computing device, including mobile computers or mobile computing devices (e.g., tablet computers, personal digital assistants, laptop computers, notebook computers, netbooks, etc.), mobile phones (e.g., smart phones), wearable computing devices (e.g., smart watches, smart glasses, etc.) or other types of mobile devices, or stationary computing devices such as desktop computers or PCs. The computing device 800 may also be a mobile or stationary server.

The processor 820 is used to execute the following computer-executable instructions to: acquire an initial value of the input power of an optical cable; based on the initial value of the input power of the optical cable, obtain the output power of each channel at the end of any section of the optical cable according to the loss of the optical cable; take the output power of each channel at the end of the section of the optical cable as a boundary condition, and calculate the input power of each channel at the section of the optical cable based on an amount of optical power transferred from a high-frequency channel to a low-frequency channel due to the SRS effect; and calculate a first parameter value of an optical amplifier of the section of the optical cable using the input power of each channel at the section of the optical cable and the output power of each channel at the end of a preceding section of the section of the optical cable.

The above is a schematic solution of an exemplary computing device according to some embodiments. It should be noted that the technical solution of the computing device and the technical solution of the above-mentioned method for calculating the configuration of the optical transmission network belong to the same or similar concept. For the detailed contents that are not described in the technical solution of the computing device, reference can be made to the description of the technical solution of the above-mentioned method for calculating the configuration of the optical transmission network.

Some embodiments of this disclosure further provides a transitory or non-transitory computer-readable storage medium storing a set of instructions that are executable by one or more processors of a device to cause the device to perform: acquire an initial value of the input power of an optical cable; based on the initial value of the input power of the optical cable, obtain the output power of each channel at the end of any section of the optical cable according to the loss of the optical cable; take the output power of each channel at the end of the section of the optical cable as a boundary condition, and calculate the input power of each channel at the section of the optical cable based on an amount of optical power transferred from a high-frequency channel to a low-frequency channel due to the SRS effect; and calculate a first parameter value of an optical amplifier of the section of the optical cable using the input power of each channel at the section of the optical cable and the output power of each channel at the end of a preceding section of the section of the optical cable.

The above is a schematic solution of a computer-readable storage medium according to some embodiments. It should be noted that the technical solution of the storage medium and the technical solution of the above-mentioned method for calculating the configuration of the optical transmission network belong to the same or similar concept. For the detailed contents that are not described in the technical solution of the storage medium, reference can be made to the description of the technical solution of the above-mentioned method for calculating the configuration of the optical transmission network.

The foregoing describes specific embodiments of this disclosure. Other embodiments fall within the scope of the appended claims. In some cases, the actions or steps recorded in the claims can be performed in an order different from the orders in the embodiments and can still achieve desired results. In addition, the processes depicted in the accompanying drawings do not necessarily require specific sequences or consecutive sequences to achieve an expected result. In some embodiments, multitasking and parallel processing may also be feasible or may be advantageous.

The computer instructions include computer program code, which may be in source code form, in object code form, an executable file or in some intermediate form, etc. The transitory or non-transitory computer-readable storage medium may include any entity or apparatus capable of carrying the computer program code, a recording medium, a U disk, a removable hard disk, a magnetic disk, an optical disk, a computer memory, a Read-Only Memory (ROM), a Random Access Memory (RAM), an electric carrier signal, a telecommunication signal and a software distribution medium, etc. It should be noted that the content contained in the computer-readable medium may be appropriately increased or decreased according to the requirements of legislation and patent practice in the jurisdiction. For example, in some jurisdictions, according to legislation and patent practice, the computer-readable medium does not include an electric carrier signal and a telecommunication signal.

It should be noted that, for the convenience of description, the foregoing method embodiments are all expressed as a series of action combinations, but the embodiments of this disclosure are not limited by the described action sequences because certain steps can be performed in other orders or simultaneously according to the embodiments of this disclosure. Secondly, the embodiments described in the disclosure are all preferred embodiments, and the actions and modules involved are not always all necessary for the embodiments of this disclosure.

In the above-mentioned embodiments, the description of each embodiment has its own emphasis. For parts that are not described in detail in a certain embodiment, reference can be made to related descriptions of other embodiments.

The embodiments may further be described using the following clauses:

1. A method for calculating configuration of an optical transmission network, comprising:
    acquiring an initial value of an input power of an optical cable;
    based on the initial value of the input power of the optical cable, obtaining an output power of each channel at an end of a section of the optical cable according to a loss of the optical cable;
    taking the output power of each channel at the end of the section of the optical cable as a boundary condition to calculate the input power of each channel at the section of the optical cable based on an amount of optical power transferred from a high-frequency channel to a low-frequency channel due to an SRS effect; and
    calculating a first parameter value of an optical amplifier of the section of the optical cable using the input power of each channel at the section of the optical cable and the output power of each channel at the end of a preceding section of the section of the optical cable.

2. The method of clause 1, further comprising:
    calculating, with an iterative algorithm, a second parameter value of the optical amplifier of the section of the optical cable under the condition that an objective function of a noise calculation model including the SRS effect achieves an optimization goal, wherein the optimization goal is to maximize a minimum value of a GSNR of each channel of the section of the optical cable, and an input to a first iteration of the objective function includes the first parameter value.

3. The method of clause 2, wherein in an expression of the objective function, a function value of the objective function is positively correlated with a mean value of the GSNR of each channel, and negatively correlated with a standard deviation of the GSNR of each channel.

4. The method of clause 2 or clause 3, wherein the calculating, with the iterative algorithm, the second parameter value of the optical amplifier of the section of the optical cable under the condition that the objective function of the noise calculation model including the SRS effect achieves the optimization goal comprises:
   taking the first parameter value as a current configuration of parameters of the optical amplifier;
   determining whether the function value of the objective function achieves the optimization goal under the current configuration;
   in response to a determination that the optimization goal is achieved under the current configuration, taking the parameter value of the current configuration as the second parameter value;
   in response to a determination that the optimization goal is not achieved under the current configuration:
      calculating a derivative of each variable of the objective function with respect to the parameter under the current configuration;
      using the derivative of each variable with respect to the parameter to calculate a derivative of the objective function with respect to variation of the parameter of each variable;
      calculating a parameter adjustment step size according to a preset step size coefficient and the derivative of the objective function with respect to the variation of the parameter of each variable;
      calculating a parameter value for next iteration according to the parameter adjustment step size;
      updating the parameter value for the next iteration to the current configuration of the parameter; and
      returning to the step of determining whether the function value of the objective function achieves the optimization goal under the current configuration.

5. The method of any of clauses 1-4, further comprising:
   configuring the calculated parameter value to the corresponding optical amplifier, and acquiring first performance data of an electrical layer device under the configuration;
   adjusting the parameter value to obtain an adjusted third parameter value;
   configuring the third parameter value to the corresponding optical amplifier, and acquiring second performance data of the electrical layer device under the configuration;
   calculating variation of a function value of a device performance optimization function respectively in the case of the configuration corresponding to the first performance data and in the case of the configuration corresponding to the second performance data;
   determining, according to the variation of the function value of the device performance optimization function, whether a convergence condition is satisfied; and
   in response to a determination that the convergence condition is satisfied, determining that the parameter value of a final configuration of the corresponding optical amplifier is obtained; or
   in response to a determination that the convergence condition is not satisfied:
      calculating a parameter adjustment value according to the variation of the function value of the device performance optimization function;
      calculating a fourth parameter value of the corresponding optical amplifier according to the parameter adjustment value;
      taking the fourth parameter value as a recalculated parameter value; and
      returning to the step of configuring the calculated parameter value to the corresponding optical amplifier and acquiring the first performance data of the electrical layer device under the configuration.

6. The method of any of clauses 1-5, wherein the taking the output power of each channel at the end of the section of the optical cable as the boundary condition to calculate the input power of each channel at the section of the optical cable based on the amount of the optical power transferred from the high-frequency channel to the low-frequency channel due to the SRS effect comprises:
   taking the output power of each channel at the end of the section of the optical cable as the boundary condition to solve a differential equation system for calculating the input power of the section of the optical cable to obtain the input power of the section of the optical cable;
   wherein the differential equation system includes an attenuation differential expression and a transfer differential expression;
   the attenuation differential expression is used to represent an amount of signal power attenuated along a transmission distance; and
   the transfer differential expression is used to represent an amount of optical power transferred from the high-frequency channel to the low-frequency channel due to the SRS effect, and the transferred amount is determined according to a Raman gain coefficient, an optical fiber effective area, signal power of each point of each channel at the end of the optical cable and a signal center frequency of each channel at the end of the optical cable.

7. The method of any of clauses 1-6, wherein the calculating the first parameter value of the optical amplifier of the section of the optical cable using the input power of each channel at the section of the optical cable and the output power of each channel at the end of the preceding section of the section of the optical cable comprises:
   obtaining a first gain of the optical amplifier according to a ratio of a total input power of each channel at the section of the optical cable to a total output power of each channel at the end of the preceding section of the section of the optical cable;
   determining a linear fitting slope by linearly fitting the gain of each channel of the section of the optical cable; and
   determining a first slope of the optical amplifier according to a product of the linear fitting slope and a gain width of the optical amplifier.

8. The method of any of clauses 1-7, wherein the method is applied to a management terminal interacting with each network node of the optical transmission network, each network node has its own optical amplifier, each network node is interconnected with one another through an optical multiplex section, and the method further comprises:
   configuring the parameter value of a final configuration to the corresponding optical amplifier under the condition that the parameter value of the final configuration of the optical amplifier of the section of the optical cable is determined; and in response to an optical amplifier being unconfigured, for a section of the optical cable of the unconfigured optical amplifier, performing the step of acquiring the initial value of the input power of the optical cable.

9. An apparatus for calculating configuration of an optical transmission network, comprising:
an initial value acquisition module configured to acquire an initial value of an input power of an optical cable;
an output calculation module configured to obtain, based on the initial value of the input power of the optical cable, an output power of each channel at an end of a section of the optical cable according to a loss of the optical cable;
an input calculation module configured to take the output power of each channel at the end of the section of the optical cable as a boundary condition to calculate the input power of each channel at the section of the optical cable based on an amount of optical power transferred from a high-frequency channel to a low-frequency channel due to an SRS effect; and
a configuration calculation module configured to calculate a first parameter value of an optical amplifier of the section of the optical cable using the input power of each channel at the section of the optical cable and the output power of each channel at the end of a preceding section of the section of the optical cable.

10. The apparatus of clause 9, further comprising:
a first optimization module configured to calculate, with an iterative algorithm, a second parameter value of the optical amplifier of the section of the optical cable under the condition that an objective function of a noise calculation model including the SRS effect achieves an optimization goal, wherein the optimization goal is to maximize a minimum value of a GSNR of each channel of the section of the optical cable, and an input to a first iteration of the objective function includes the first parameter value.

11. The apparatus of clause 10, wherein in an expression of the objective function, a function value of the objective function is positively correlated with a mean value of the GSNR of each channel, and negatively correlated with a standard deviation of the GSNR of each channel.

12. The apparatus of clause 10 or clause 11, wherein the first optimization module comprises:
a configuration sub-module configured to take the first parameter value as a current configuration of parameters of the optical amplifier;
an optimization judgment sub-module 6102 configured to determine whether the function value of the objective function achieves the optimization goal under the current configuration;
an optimization configuration sub-module configured to, in response to a determination that the optimization goal is achieved under the current configuration, take the parameter value of the current configuration as the second parameter value;
a first derivative calculation sub-module configured to, in response to a determination that the optimization goal is not achieved under the current configuration, calculate a derivative of each variable of the objective function with respect to the parameter under the current configuration;
a second derivative calculation sub-module configured to, using the derivative of each variable with respect to the parameter, calculate a derivative of the objective function with respect to variation of the parameter of each variable;
a step size calculation sub-module configured to calculate a parameter adjustment step size according to a preset step size coefficient and the derivative of the objective function with respect to the variation of the parameter of each variable; and
an update configuration sub-module configured to calculate a parameter value for next iteration according to the parameter adjustment step size.

13. The apparatus of any of clauses 9-12, further comprising:
a first configuration module configured to configure the calculated parameter value to the corresponding optical amplifier, and acquiring first performance data of an electrical layer device under the configuration;
an adjustment module configured to adjust the parameter value to obtain an adjusted third parameter value;
a second configuration module configured to configure the third parameter value to the corresponding optical amplifier, and acquiring second performance data of the electrical layer device under the configuration;
a variation acquisition module configured to calculate variation of a function value of a device performance optimization function respectively in the case of the configuration corresponding to the first performance data and in the case of the configuration corresponding to the second performance data;
a convergence judgment module configured to determine, according to the variation of the function value of the device performance optimization function, whether a convergence condition is satisfied, and, in response to a determination that the convergence condition is satisfied, determine that the parameter value of a final configuration of the corresponding optical amplifier is obtained; and
a third configuration module configured to, in response to a determination that the convergence condition is not satisfied, calculate a parameter adjustment value according to the variation of the function value of the device performance optimization function, calculate a fourth parameter value of the corresponding optical amplifier according to the parameter adjustment value, take the fourth parameter value as a recalculated parameter value, and trigger the first configuration module to perform the step of configuring the calculated parameter value to the corresponding optical amplifier and acquiring the first performance data of the electrical layer device under the configuration.

14. The apparatus of any of clauses 9-13, wherein the input calculation module is configured to take the output power of each channel at the end of the section of the optical cable as the boundary condition to solve a differential equation system for calculating the input power of the section of the optical cable to obtain the input power of the section of the optical cable;
wherein the differential equation system includes an attenuation differential expression and a transfer differential expression, the attenuation differential expression is used to represent an amount of signal power attenuated along a transmission distance, the transfer differential expression is used to represent an amount of optical power transferred from the high-frequency channel to the low-frequency channel due to the SRS effect, and the transferred amount is determined according to a Raman gain coefficient, an optical fiber effective area, signal power of each point of each channel at the end of the optical cable and a signal center frequency of each channel at the end of the optical cable.

15. The apparatus any of clauses 9-14, wherein the configuration calculation module comprises:
   a gain calculation sub-module configured to obtain a first gain of the optical amplifier according to a ratio of a total input power of each channel at the section of the optical cable to a total output power of each channel at the end of the preceding section of the section of the optical cable;
   a slope calculation sub-module configured to determine a linear fitting slope by linearly fitting the gain of each channel of the section of the optical cable and determine a first slope of the optical amplifier according to a product of the linear fitting slope and a gain width of the optical amplifier.

16. The apparatus of any of clauses 9-15, further comprising:
   a configuration determination module configured to configure the parameter value of a final configuration to the corresponding optical amplifier under the condition that the parameter value of the final configuration of the optical amplifier of the section of the optical cable is determined; and
   a configuration triggering module configured to, in response to an optical amplifier being unconfigured, for a section of the optical cable of the unconfigured optical amplifier, trigger the initial value acquisition module to re-enter the step of acquiring the initial value of the input power of the optical cable.

17. An optical transmission network system, comprising a management terminal and each network node interacting with the management terminal, wherein each network node has its own optical amplifier, and each network node is interconnected with one another through an optical multiplex section;
   wherein the management terminal is configured to calculate a parameter value of the optical amplifier of a section of the optical cable, and configure the parameter value to the corresponding optical amplifier by:
      acquiring an initial value of an input power of an optical cable;
      based on the initial value of the input power of the optical cable, obtaining an output power of each channel at an end of a section of the optical cable according to a loss of the optical cable;
      taking the output power of each channel at the end of the section of the optical cable as a boundary condition to calculate the input power of each channel at the section of the optical cable based on an amount of optical power transferred from a high-frequency channel to a low-frequency channel due to an SRS effect; and
      calculating a first parameter value of an optical amplifier of the section of the optical cable using the input power of each channel at the section of the optical cable and the output power of each channel at the end of a preceding section of the section of the optical cable;
   wherein the optical amplifier is configured to set parameters according to the configuration of the management terminal.

18. A computing device, comprising:
   a memory configured to store computer-executable instructions; and
   one or more processors coupled to the memory and configured to execute the computer-executable instructions to:
      acquire an initial value of an input power of an optical cable;
      based on the initial value of the input power of the optical cable, obtain an output power of each channel at the end of a section of the optical cable according to a loss of the optical cable;
      take the output power of each channel at the end of the section of the optical cable as a boundary condition to calculate the input power of each channel at the section of the optical cable based on an amount of optical power transferred from a high-frequency channel to a low-frequency channel due to an SRS effect; and
      calculate a first parameter value of an optical amplifier of the section of the optical cable using the input power of each channel at the section of the optical cable and the output power of each channel at the end of a preceding section of the section of the optical cable.

19. The computing device of clause 18, wherein the one or more processors are configured to execute the set of instructions to:
   calculate, with an iterative algorithm, a second parameter value of the optical amplifier of the section of the optical cable under the condition that an objective function of a noise calculation model including the SRS effect achieves an optimization goal, wherein the optimization goal is to maximize a minimum value of a GSNR of each channel of the section of the optical cable, and an input to a first iteration of the objective function includes the first parameter value.

20. The computing device of clause 19, wherein in an expression of the objective function, a function value of the objective function is positively correlated with a mean value of the GSNR of each channel, and negatively correlated with a standard deviation of the GSNR of each channel.

21. The computing device of clause 19 or clause 20, wherein the one or more processors are configured to execute the set of instructions to calculate, with the iterative algorithm, the second parameter value of the optical amplifier of the section of the optical cable under the condition that the objective function of the noise calculation model including the SRS effect achieves the optimization goal by:
   taking the first parameter value as a current configuration of parameters of the optical amplifier;
   determining whether the function value of the objective function achieves the optimization goal under the current configuration;
   in response to a determination that the optimization goal is achieved under the current configuration, taking the parameter value of the current configuration as the second parameter value;
   in response to a determination that the optimization goal is not achieved under the current configuration:
      calculating a derivative of each variable of the objective function with respect to the parameter under the current configuration;
      using the derivative of each variable with respect to the parameter to calculate a derivative of the objective function with respect to variation of the parameter of each variable;
      calculating a parameter adjustment step size according to a preset step size coefficient and the derivative of the objective function with respect to the variation of the parameter of each variable;

calculating a parameter value for next iteration according to the parameter adjustment step size;

updating the parameter value for the next iteration to the current configuration of the parameter; and returning to the step of determining whether the function value of the objective function achieves the optimization goal under the current configuration.

22. The computing device of any of clauses 18-21, wherein the one or more processors are configured to execute the set of instructions to:

configure the calculated parameter value to the corresponding optical amplifier, and acquiring first performance data of an electrical layer device under the configuration;

adjust the parameter value to obtain an adjusted third parameter value;

configure the third parameter value to the corresponding optical amplifier, and acquiring second performance data of the electrical layer device under the configuration;

calculate variation of a function value of a device performance optimization function respectively in the case of the configuration corresponding to the first performance data and in the case of the configuration corresponding to the second performance data;

determine, according to the variation of the function value of the device performance optimization function, whether a convergence condition is satisfied;

in response to a determination that the convergence condition is satisfied, determine that the parameter value of a final configuration of the corresponding optical amplifier is obtained; and in response to a determination that the convergence condition is not satisfied:

calculate a parameter adjustment value according to the variation of the function value of the device performance optimization function;

calculate a fourth parameter value of the corresponding optical amplifier according to the parameter adjustment value;

take the fourth parameter value as a recalculated parameter value; and return to the step of configuring the calculated parameter value to the corresponding optical amplifier and acquiring the first performance data of the electrical layer device under the configuration.

23. The computing device of any of clauses 18-22, wherein the one or more processors are configured to execute the set of instructions to take the output power of each channel at the end of the section of the optical cable as the boundary condition to calculate the input power of each channel at the section of the optical cable based on the amount of the optical power transferred from the high-frequency channel to the low-frequency channel due to the SRS effect by:

taking the output power of each channel at the end of the section of the optical cable as the boundary condition to solve a differential equation system for calculating the input power of the section of the optical cable to obtain the input power of the section of the optical cable;

wherein the differential equation system includes an attenuation differential expression and a transfer differential expression;

the attenuation differential expression is used to represent an amount of signal power attenuated along a transmission distance; and the transfer differential expression is used to represent an amount of optical power transferred from the high-frequency channel to the low-frequency channel due to the SRS effect, and the transferred amount is determined according to a Raman gain coefficient, an optical fiber effective area, signal power of each point of each channel at the end of the optical cable and a signal center frequency of each channel at the end of the optical cable.

24. The computing device of any of clauses 18-23, wherein the one or more processors are configured to execute the set of instructions to calculate the first parameter value of the optical amplifier of the section of the optical cable using the input power of each channel at the section of the optical cable and the output power of each channel at the end of the preceding section of the section of the optical cable by:

obtaining a first gain of the optical amplifier according to a ratio of a total input power of each channel at the section of the optical cable to a total output power of each channel at the end of the preceding section of the section of the optical cable;

determining a linear fitting slope by linearly fitting the gain of each channel of the section of the optical cable; and determining a first slope of the optical amplifier according to a product of the linear fitting slope and a gain width of the optical amplifier.

25. The computing device of any of clauses 18-24, wherein the one or more processors are configured to execute the set of instructions to:

configuring the parameter value of a final configuration to the corresponding optical amplifier under the condition that the parameter value of the final configuration of the optical amplifier of the section of the optical cable is determined; and in response to an optical amplifier being unconfigured, for a section of the optical cable of the unconfigured optical amplifier, performing the step of acquiring the initial value of the input power of the optical cable.

26. A non-transitory computer-readable storage medium storing a set of instructions that are executable by one or more processors of a device to cause the device to perform a method for calculating configuration of an optical transmission network, the method comprising:

acquiring an initial value of an input power of an optical cable;

based on the initial value of the input power of the optical cable, obtaining an output power of each channel at an end of a section of the optical cable according to a loss of the optical cable;

taking the output power of each channel at the end of the section of the optical cable as a boundary condition to calculate the input power of each channel at the section of the optical cable based on an amount of optical power transferred from a high-frequency channel to a low-frequency channel due to an SRS effect; and calculating a first parameter value of an optical amplifier of the section of the optical cable using the input power of each channel at the section of the optical cable and the output power of each channel at the end of a preceding section of the section of the optical cable.

27. The non-transitory computer-readable storage medium of clause 26, wherein the set of instructions is executable by the one or more processors of the device to cause the device to further perform:

calculating, with an iterative algorithm, a second parameter value of the optical amplifier of the section of the optical cable under the condition that an objective function of a noise calculation model including the SRS effect achieves an optimization goal, wherein the optimization goal is to maximize a minimum value of a GSNR of each channel of the section of the optical cable, and an input to a first iteration of the objective function includes the first parameter value.

28. The non-transitory computer-readable storage medium of clause 27, wherein in an expression of the objective function, a function value of the objective function is positively correlated with a mean value of the GSNR of each channel, and negatively correlated with a standard deviation of the GSNR of each channel.

29. The non-transitory computer-readable storage medium of clause 27 or clause 28, wherein the set of instructions is executable by the one or more processors of the device to cause the device to further perform calculating, with the iterative algorithm, the second parameter value of the optical amplifier of the section of the optical cable under the condition that the objective function of the noise calculation model including the SRS effect achieves the optimization goal by:
  taking the first parameter value as a current configuration of parameters of the optical amplifier;
  determining whether the function value of the objective function achieves the optimization goal under the current configuration;
  in response to a determination that the optimization goal is achieved under the current configuration, taking the parameter value of the current configuration as the second parameter value;
  in response to a determination that the optimization goal is not achieved under the current configuration:
    calculating a derivative of each variable of the objective function with respect to the parameter under the current configuration;
    using the derivative of each variable with respect to the parameter to calculate a derivative of the objective function with respect to variation of the parameter of each variable;
    calculating a parameter adjustment step size according to a preset step size coefficient and the derivative of the objective function with respect to the variation of the parameter of each variable;
    calculating a parameter value for next iteration according to the parameter adjustment step size;
    updating the parameter value for the next iteration to the current configuration of the parameter; and
    returning to the step of determining whether the function value of the objective function achieves the optimization goal under the current configuration.

30. The non-transitory computer-readable storage medium of any of clauses 26-29, wherein the set of instructions is executable by the one or more processors of the device to cause the device to further perform:
  configuring the calculated parameter value to the corresponding optical amplifier, and acquiring first performance data of an electrical layer device under the configuration;
  adjusting the parameter value to obtain an adjusted third parameter value;
  configuring the third parameter value to the corresponding optical amplifier, and acquiring second performance data of the electrical layer device under the configuration;
  calculating variation of a function value of a device performance optimization function respectively in the case of the configuration corresponding to the first performance data and in the case of the configuration corresponding to the second performance data;
  determining, according to the variation of the function value of the device performance optimization function, whether a convergence condition is satisfied;
  in response to a determination that the convergence condition is satisfied, determining that the parameter value of a final configuration of the corresponding optical amplifier is obtained; and
  in response to a determination that the convergence condition is not satisfied:
    calculating a parameter adjustment value according to the variation of the function value of the device performance optimization function;
    calculating a fourth parameter value of the corresponding optical amplifier according to the parameter adjustment value;
    taking the fourth parameter value as a recalculated parameter value; and
    returning to the step of configuring the calculated parameter value to the corresponding optical amplifier and acquiring the first performance data of the electrical layer device under the configuration.

31. The non-transitory computer-readable storage medium of any of clauses 26-30, wherein the set of instructions is executable by the one or more processors of the device to cause the device to further perform taking the output power of each channel at the end of the section of the optical cable as the boundary condition to calculate the input power of each channel at the section of the optical cable based on the amount of the optical power transferred from the high-frequency channel to the low-frequency channel due to the SRS effect by:
  taking the output power of each channel at the end of the section of the optical cable as the boundary condition to solve a differential equation system for calculating the input power of the section of the optical cable to obtain the input power of the section of the optical cable;
  wherein the differential equation system includes an attenuation differential expression and a transfer differential expression;
  the attenuation differential expression is used to represent an amount of signal power attenuated along a transmission distance; and
  the transfer differential expression is used to represent an amount of optical power transferred from the high-frequency channel to the low-frequency channel due to the SRS effect, and the transferred amount is determined according to a Raman gain coefficient, an optical fiber effective area, signal power of each point of each channel at the end of the optical cable and a signal center frequency of each channel at the end of the optical cable.

32. The non-transitory computer-readable storage medium of any of clauses 26-31, wherein the set of instructions is executable by the one or more processors of the device to cause the device to further perform calculating the first parameter value of the optical amplifier of the section of the optical cable using the input power of each channel at the section of the optical cable and the output power of each channel at the end of the preceding section of the section of the optical cable by:
  obtaining a first gain of the optical amplifier according to a ratio of a total input power of each channel at the section of the optical cable to a total output power of each channel at the end of the preceding section of the section of the optical cable;

determining a linear fitting slope by linearly fitting the gain of each channel of the section of the optical cable; and determining a first slope of the optical amplifier according to a product of the linear fitting slope and a gain width of the optical amplifier.

33. The non-transitory computer-readable storage medium of any of clauses 26-32, wherein the method is applied to a management terminal interacting with each network node of the optical transmission network, each network node has its own optical amplifier, each network node is interconnected with one another through an optical multiplex section, and the set of instructions is executable by the one or more processors of the device to cause the device to further perform:

configuring the parameter value of a final configuration to the corresponding optical amplifier under the condition that the parameter value of the final configuration of the optical amplifier of the section of the optical cable is determined; and in response to an optical amplifier being unconfigured, for a section of the optical cable of the unconfigured optical amplifier, performing the step of acquiring the initial value of the input power of the optical cable.

The preferred embodiments of this disclosure disclosed above are provided only to aid in the elaboration of this disclosure. Alternative embodiments are not intended to elaborate all details, nor do they limit the disclosure to only the described embodiments. It is obvious that many modifications and changes can be made in accordance with the contents of the embodiments of this disclosure. These embodiments are selected and described in this disclosure to better explain the principles and practical applications of the embodiments of this disclosure, so that those skilled in the art can well understand and utilize this disclosure. This disclosure is limited only by the claims and their full scope and equivalents.

The invention claimed is:

1. A method for calculating configuration of an optical transmission network, comprising:

acquiring an initial value of an input power of an optical cable;

based on the initial value of the input power of the optical cable, obtaining an output power of each channel at an end of a section of the optical cable according to a loss of the optical cable;

taking the output power of each channel at the end of the section of the optical cable as a boundary condition to calculate the input power of each channel at the section of the optical cable based on an amount of optical power transferred from a high-frequency channel to a low-frequency channel due to an SRS effect; and calculating a first parameter value of an optical amplifier of the section of the optical cable using the input power of each channel at the section of the optical cable and the output power of each channel at the end of a preceding section of the section of the optical cable.

2. The method of claim 1, further comprising:

calculating, with an iterative algorithm, a second parameter value of the optical amplifier of the section of the optical cable under the condition that an objective function of a noise calculation model including the SRS effect achieves an optimization goal, wherein the optimization goal is to maximize a minimum value of a GSNR of each channel of the section of the optical cable, and an input to a first iteration of the objective function includes the first parameter value.

3. The method of claim 2, wherein in an expression of the objective function, a function value of the objective function is positively correlated with a mean value of the GSNR of each channel, and negatively correlated with a standard deviation of the GSNR of each channel.

4. The method of claim 2, wherein the calculating, with the iterative algorithm, the second parameter value of the optical amplifier of the section of the optical cable under the condition that the objective function of the noise calculation model including the SRS effect achieves the optimization goal comprises:

taking the first parameter value as a current configuration of parameters of the optical amplifier;

determining whether the function value of the objective function achieves the optimization goal under the current configuration;

in response to a determination that the optimization goal is achieved under the current configuration, taking the parameter value of the current configuration as the second parameter value;

in response to a determination that the optimization goal is not achieved under the current configuration:

calculating a derivative of each variable of the objective function with respect to the parameter under the current configuration;

using the derivative of each variable with respect to the parameter to calculate a derivative of the objective function with respect to variation of the parameter of each variable;

calculating a parameter adjustment step size according to a preset step size coefficient and the derivative of the objective function with respect to the variation of the parameter of each variable;

calculating a parameter value for next iteration according to the parameter adjustment step size;

updating the parameter value for the next iteration to the current configuration of the parameter; and returning to the step of determining whether the function value of the objective function achieves the optimization goal under the current configuration.

5. The method of claim 1, further comprising:

configuring the calculated parameter value to the corresponding optical amplifier, and acquiring first performance data of an electrical layer device under the configuration;

adjusting the parameter value to obtain an adjusted third parameter value;

configuring the third parameter value to the corresponding optical amplifier, and acquiring second performance data of the electrical layer device under the configuration;

calculating variation of a function value of a device performance optimization function respectively in the case of the configuration corresponding to the first performance data and in the case of the configuration corresponding to the second performance data;

determining, according to the variation of the function value of the device performance optimization function, whether a convergence condition is satisfied; and in response to a determination that the convergence condition is satisfied, determining that the parameter value of a final configuration of the corresponding optical amplifier is obtained; or in response to a determination that the convergence condition is not satisfied:
  calculating a parameter adjustment value according to the variation of the function value of the device performance optimization function;
  calculating a fourth parameter value of the corresponding optical amplifier according to the parameter adjustment value;
  taking the fourth parameter value as a recalculated parameter value; and
  returning to the step of configuring the calculated parameter value to the corresponding optical amplifier and acquiring the first performance data of the electrical layer device under the configuration.

6. The method of claim 1, wherein the taking the output power of each channel at the end of the section of the optical cable as the boundary condition to calculate the input power of each channel at the section of the optical cable based on the amount of the optical power transferred from the high-frequency channel to the low-frequency channel due to the SRS effect comprises:
  taking the output power of each channel at the end of the section of the optical cable as the boundary condition to solve a differential equation system for calculating the input power of the section of the optical cable to obtain the input power of the section of the optical cable;
  wherein the differential equation system includes an attenuation differential expression and a transfer differential expression;
  the attenuation differential expression is used to represent an amount of signal power attenuated along a transmission distance; and
  the transfer differential expression is used to represent an amount of optical power transferred from the high-frequency channel to the low-frequency channel due to the SRS effect, and the transferred amount is determined according to a Raman gain coefficient, an optical fiber effective area, signal power of each point of each channel at the end of the optical cable and a signal center frequency of each channel at the end of the optical cable.

7. The method of claim 1, wherein the calculating the first parameter value of the optical amplifier of the section of the optical cable using the input power of each channel at the section of the optical cable and the output power of each channel at the end of the preceding section of the section of the optical cable comprises:
  obtaining a first gain of the optical amplifier according to a ratio of a total input power of each channel at the section of the optical cable to a total output power of each channel at the end of the preceding section of the section of the optical cable;
  determining a linear fitting slope by linearly fitting the gain of each channel of the section of the optical cable; and
  determining a first slope of the optical amplifier according to a product of the linear fitting slope and a gain width of the optical amplifier.

8. The method of claim 1, wherein the method is applied to a management terminal interacting with each network node of the optical transmission network, each network node has its own optical amplifier, each network node is interconnected with one another through an optical multiplex section, and the method further comprises:
  configuring the parameter value of a final configuration to the corresponding optical amplifier under the condition that the parameter value of the final configuration of the optical amplifier of the section of the optical cable is determined; and
  in response to an optical amplifier being unconfigured, for a section of the optical cable of the unconfigured optical amplifier, performing the step of acquiring the initial value of the input power of the optical cable.

9. A computing device, comprising:
  a memory configured to store computer-executable instructions; and
  one or more processors coupled to the memory and configured to execute the computer-executable instructions to:
  acquire an initial value of an input power of an optical cable;
  based on the initial value of the input power of the optical cable, obtain an output power of each channel at the end of a section of the optical cable according to a loss of the optical cable;
  take the output power of each channel at the end of the section of the optical cable as a boundary condition to calculate the input power of each channel at the section of the optical cable based on an amount of optical power transferred from a high-frequency channel to a low-frequency channel due to an SRS effect; and
  calculate a first parameter value of an optical amplifier of the section of the optical cable using the input power of each channel at the section of the optical cable and the output power of each channel at the end of a preceding section of the section of the optical cable.

10. The computing device of claim 9, wherein the one or more processors are configured to execute the set of instructions to:
  calculate, with an iterative algorithm, a second parameter value of the optical amplifier of the section of the optical cable under the condition that an objective function of a noise calculation model including the SRS effect achieves an optimization goal, wherein the optimization goal is to maximize a minimum value of a GSNR of each channel of the section of the optical cable, and an input to a first iteration of the objective function includes the first parameter value.

11. The computing device of claim 10, wherein in an expression of the objective function, a function value of the objective function is positively correlated with a mean value of the GSNR of each channel, and negatively correlated with a standard deviation of the GSNR of each channel.

12. The computing device of claim 10, wherein the one or more processors are configured to execute the set of instructions to calculate, with the iterative algorithm, the second parameter value of the optical amplifier of the section of the optical cable under the condition that the objective function of the noise calculation model including the SRS effect achieves the optimization goal by:
  taking the first parameter value as a current configuration of parameters of the optical amplifier;
  determining whether the function value of the objective function achieves the optimization goal under the current configuration;
  in response to a determination that the optimization goal is achieved under the current configuration, taking the parameter value of the current configuration as the second parameter value;
  in response to a determination that the optimization goal is not achieved under the current configuration:

calculating a derivative of each variable of the objective function with respect to the parameter under the current configuration;

using the derivative of each variable with respect to the parameter to calculate a derivative of the objective function with respect to variation of the parameter of each variable;

calculating a parameter adjustment step size according to a preset step size coefficient and the derivative of the objective function with respect to the variation of the parameter of each variable;

calculating a parameter value for next iteration according to the parameter adjustment step size;

updating the parameter value for the next iteration to the current configuration of the parameter; and returning to the step of determining whether the function value of the objective function achieves the optimization goal under the current configuration.

13. The computing device of claim 9, wherein the one or more processors are configured to execute the set of instructions to:

configure the calculated parameter value to the corresponding optical amplifier, and acquiring first performance data of an electrical layer device under the configuration;

adjust the parameter value to obtain an adjusted third parameter value;

configure the third parameter value to the corresponding optical amplifier, and acquiring second performance data of the electrical layer device under the configuration;

calculate variation of a function value of a device performance optimization function respectively in the case of the configuration corresponding to the first performance data and in the case of the configuration corresponding to the second performance data;

determine, according to the variation of the function value of the device performance optimization function, whether a convergence condition is satisfied;

in response to a determination that the convergence condition is satisfied, determine that the parameter value of a final configuration of the corresponding optical amplifier is obtained; and in response to a determination that the convergence condition is not satisfied:

calculate a parameter adjustment value according to the variation of the function value of the device performance optimization function;

calculate a fourth parameter value of the corresponding optical amplifier according to the parameter adjustment value;

take the fourth parameter value as a recalculated parameter value; and return to the step of configuring the calculated parameter value to the corresponding optical amplifier and acquiring the first performance data of the electrical layer device under the configuration.

14. The computing device of claim 9, wherein the one or more processors are configured to execute the set of instructions to take the output power of each channel at the end of the section of the optical cable as the boundary condition to calculate the input power of each channel at the section of the optical cable based on the amount of the optical power transferred from the high-frequency channel to the low-frequency channel due to the SRS effect by:

taking the output power of each channel at the end of the section of the optical cable as the boundary condition to solve a differential equation system for calculating the input power of the section of the optical cable to obtain the input power of the section of the optical cable;

wherein the differential equation system includes an attenuation differential expression and a transfer differential expression;

the attenuation differential expression is used to represent an amount of signal power attenuated along a transmission distance; and the transfer differential expression is used to represent an amount of optical power transferred from the high-frequency channel to the low-frequency channel due to the SRS effect, and the transferred amount is determined according to a Raman gain coefficient, an optical fiber effective area, signal power of each point of each channel at the end of the optical cable and a signal center frequency of each channel at the end of the optical cable.

15. The computing device of claim 9, wherein the one or more processors are configured to execute the set of instructions to calculate the first parameter value of the optical amplifier of the section of the optical cable using the input power of each channel at the section of the optical cable and the output power of each channel at the end of the preceding section of the section of the optical cable by:

obtaining a first gain of the optical amplifier according to a ratio of a total input power of each channel at the section of the optical cable to a total output power of each channel at the end of the preceding section of the section of the optical cable;

determining a linear fitting slope by linearly fitting the gain of each channel of the section of the optical cable; and determining a first slope of the optical amplifier according to a product of the linear fitting slope and a gain width of the optical amplifier.

16. The computing device of claim 9, wherein the one or more processors are configured to execute the set of instructions to:

configuring the parameter value of a final configuration to the corresponding optical amplifier under the condition that the parameter value of the final configuration of the optical amplifier of the section of the optical cable is determined; and in response to an optical amplifier being unconfigured, for a section of the optical cable of the unconfigured optical amplifier, performing the step of acquiring the initial value of the input power of the optical cable.

17. A non-transitory computer-readable storage medium storing a set of instructions that are executable by one or more processors of a device to cause the device to perform a method for calculating configuration of an optical transmission network, the method comprising:

acquiring an initial value of an input power of an optical cable;

based on the initial value of the input power of the optical cable, obtaining an output power of each channel at an end of a section of the optical cable according to a loss of the optical cable;

taking the output power of each channel at the end of the section of the optical cable as a boundary condition to calculate the input power of each channel at the section of the optical cable based on an amount of optical power transferred from a high-frequency channel to a low-frequency channel due to an SRS effect; and calculating a first parameter value of an optical amplifier of the section of the optical cable using the input power of each channel at the section of the optical cable and the output power of each channel at the end of a preceding section of the section of the optical cable.

18. The non-transitory computer-readable storage medium of claim 17, wherein the set of instructions is executable by the one or more processors of the device to cause the device to further perform:
  calculating, with an iterative algorithm, a second parameter value of the optical amplifier of the section of the optical cable under the condition that an objective function of a noise calculation model including the SRS effect achieves an optimization goal, wherein the optimization goal is to maximize a minimum value of a GSNR of each channel of the section of the optical cable, and an input to a first iteration of the objective function includes the first parameter value.

19. The non-transitory computer-readable storage medium of claim 18, wherein in an expression of the objective function, a function value of the objective function is positively correlated with a mean value of the GSNR of each channel, and negatively correlated with a standard deviation of the GSNR of each channel.

20. The non-transitory computer-readable storage medium of claim 18, wherein the set of instructions is executable by the one or more processors of the device to cause the device to further perform calculating, with the iterative algorithm, the second parameter value of the optical amplifier of the section of the optical cable under the condition that the objective function of the noise calculation model including the SRS effect achieves the optimization goal by:
  taking the first parameter value as a current configuration of parameters of the optical amplifier;
  determining whether the function value of the objective function achieves the optimization goal under the current configuration;
  in response to a determination that the optimization goal is achieved under the current configuration, taking the parameter value of the current configuration as the second parameter value;
  in response to a determination that the optimization goal is not achieved under the current configuration:
    calculating a derivative of each variable of the objective function with respect to the parameter under the current configuration;
    using the derivative of each variable with respect to the parameter to calculate a derivative of the objective function with respect to variation of the parameter of each variable;
    calculating a parameter adjustment step size according to a preset step size coefficient and the derivative of the objective function with respect to the variation of the parameter of each variable;
    calculating a parameter value for next iteration according to the parameter adjustment step size;
    updating the parameter value for the next iteration to the current configuration of the parameter; and
    returning to the step of determining whether the function value of the objective function achieves the optimization goal under the current configuration.

* * * * *